(12) United States Patent
Hicks, II et al.

(10) Patent No.: US 12,135,177 B2
(45) Date of Patent: Nov. 5, 2024

(54) TUBE TRANSITION

(71) Applicant: Viking Vessel Holdings, LLC, Cisco, TX (US)

(72) Inventors: Marshall R. Hicks, II, Cleburne, TX (US); John Null, Cisco, TX (US)

(73) Assignee: Viking Vessel Holdings, LLC, Cisco, TX (US)

( * ) Notice: Subject to any disclaimer, the term of this patent is extended or adjusted under 35 U.S.C. 154(b) by 0 days.

(21) Appl. No.: 17/873,391

(22) Filed: Jul. 26, 2022

(65) Prior Publication Data

US 2023/0184497 A1 Jun. 15, 2023

Related U.S. Application Data

(63) Continuation of application No. PCT/US2021/040597, filed on Jul. 7, 2021, and a continuation-in-part of application No. 16/994,271, filed on Aug. 14, 2020.

(51) Int. Cl.
*F28F 9/18* (2006.01)
*B23P 15/26* (2006.01)
*F28F 11/02* (2006.01)

(52) U.S. Cl.
CPC ............. *F28F 9/185* (2013.01); *B23P 15/26* (2013.01); *F28F 11/02* (2013.01)

(58) Field of Classification Search
CPC .. F28F 9/0248; F28F 9/04; F28F 9/167; F28F 9/182; F28F 9/185; F28F 9/268; B23K 2101/14; F16L 13/16; F16L 13/0209; F16L 41/02; F16L 41/03; F16L 41/08; F16L 47/28; F22G 3/009
See application file for complete search history.

(56) References Cited

U.S. PATENT DOCUMENTS

| 1,368,770 A | 2/1921 | Henderson |
| 1,880,269 A | 10/1932 | Bradley |
| 1,966,403 A * | 7/1934 | Durham ................ F16L 41/084 |
| | | 219/137 R |
| 2,015,246 A | 9/1935 | Taylor |

(Continued)

FOREIGN PATENT DOCUMENTS

| DE | 1019516 B * 11/1957 ............ F16L 41/084 |
| DE | 102005054093 A1 6/2006 |

(Continued)

OTHER PUBLICATIONS

J. Carvill, Mechanical Engineer's Data Handbook, 1993, Butterworth-Heinemann, pp. 211-212 (Year: 1993).*

(Continued)

*Primary Examiner* — Jianying C Atkisson
*Assistant Examiner* — For K Ling
(74) *Attorney, Agent, or Firm* — James E. Walton

(57) ABSTRACT

A tube transition fitting is formed having a first end, a second end, a head, a body, a weld area, and a first wall thickness and second wall thickness. A tube seat is formed on a surface connected to the body, the surface being adjacent a transition from the first wall thickness to the second wall thickness. A tube transition assembly includes a header portion, the tube transition fitting, and a heat exchange tube, each being connected using one or more simplified and/or heat-optimized connections.

5 Claims, 23 Drawing Sheets

(56) References Cited

U.S. PATENT DOCUMENTS

| | | | |
|---|---|---|---|
| 2,037,962 A * | 4/1936 | Brown | F16L 13/0209 |
| | | | 285/332 |
| 2,966,373 A | 12/1960 | Yount, V | |
| 3,003,601 A * | 10/1961 | Ott | F22G 3/009 |
| | | | 219/137 R |
| 3,010,480 A | 11/1961 | Ragsdale | |
| 3,344,498 A * | 10/1967 | Hack | F16L 5/022 |
| | | | 29/455.1 |
| 3,352,578 A | 11/1967 | Burke | |
| 3,427,707 A | 2/1969 | Nowosadko | |
| 3,516,692 A | 6/1970 | Albrecht | |
| 3,638,684 A | 2/1972 | Pavilon | |
| 3,717,200 A | 2/1973 | Pavilon | |
| 3,998,376 A | 12/1976 | Haines | |
| 4,103,940 A | 8/1978 | Bills | |
| T986,007 I4 | 9/1979 | Papia | |
| 4,238,117 A * | 12/1980 | Newman | B23K 33/006 |
| | | | 256/65.1 |
| 4,296,804 A | 10/1981 | Press | |
| 4,330,924 A | 5/1982 | Kushner | |
| 4,371,199 A | 2/1983 | Kushner | |
| 4,526,137 A * | 7/1985 | Garrison | F28F 9/185 |
| | | | 122/476 |
| 4,541,656 A * | 9/1985 | Lasko | F16L 41/084 |
| | | | 285/39 |
| 4,579,087 A | 4/1986 | Stol | |
| 4,597,597 A | 7/1986 | Bloor | |
| 4,639,992 A | 2/1987 | Stol | |
| 4,654,942 A | 4/1987 | Rush | |
| 4,709,689 A * | 12/1987 | Simcox | F28F 9/162 |
| | | | 165/173 |
| 4,735,443 A | 4/1988 | Rush | |
| 4,887,851 A | 12/1989 | Rush | |
| 4,997,214 A | 3/1991 | Reese | |
| 5,056,704 A * | 10/1991 | Martin | F16L 41/082 |
| | | | 228/183 |
| 5,090,611 A * | 2/1992 | Takikawa | F02M 69/465 |
| | | | 285/133.11 |
| 5,104,155 A | 4/1992 | Krikwood | |
| 5,562,312 A | 10/1996 | Carlin | |
| 5,711,370 A | 1/1998 | Tanaka | |
| 6,129,394 A | 10/2000 | Bathla | |
| 6,253,989 B1 * | 7/2001 | Bennett | B23K 33/006 |
| | | | 228/139 |
| 6,347,663 B1 | 2/2002 | Hunzinger | |
| 6,725,517 B1 | 4/2004 | Polvi | |
| 6,839,966 B2 * | 1/2005 | Kakinuma | F16L 41/03 |
| | | | 29/237 |
| 7,011,149 B2 | 3/2006 | Fujita | |
| 7,293,689 B2 | 11/2007 | Mayers | |
| 7,472,744 B2 | 1/2009 | Gorbounov | |
| 7,543,733 B2 | 6/2009 | Wastiaux | |
| 7,568,520 B2 | 8/2009 | Ozawa | |
| 7,987,690 B2 | 8/2011 | Duggan | |
| 2004/0121660 A1 | 6/2004 | Armstrong et al. | |
| 2005/0067154 A1 | 3/2005 | Gordon | |
| 2006/0169253 A1 * | 8/2006 | Usui | F02M 55/005 |
| | | | 123/456 |
| 2006/0185167 A1 | 8/2006 | Lippa, Jr. | |
| 2008/0011456 A1 | 1/2008 | Meshenky | |
| 2008/0067806 A1 | 3/2008 | Truitt | |
| 2008/0092587 A1 | 4/2008 | Gorbounov | |
| 2008/0202622 A1 | 8/2008 | Cho | |
| 2008/0272592 A1 * | 11/2008 | Shaw | F16L 41/021 |
| | | | 285/288.1 |
| 2013/0014540 A1 | 1/2013 | Michitsuji | |
| 2013/0199462 A1 | 8/2013 | Bienentreu | |
| 2014/0311344 A1 | 10/2014 | Bossard | |
| 2016/0216145 A1 * | 7/2016 | Berberig | B23K 20/129 |
| 2018/0142966 A1 | 5/2018 | Dowell | |

FOREIGN PATENT DOCUMENTS

| | | | |
|---|---|---|---|
| EP | 0381880 B1 | 8/1990 | |
| FR | 2229010 A * | 1/1975 | F16L 41/084 |
| JP | 09280463 A * | 10/1997 | F16L 41/02 |
| JP | 2000304188 A | 11/2000 | |

OTHER PUBLICATIONS

Smith, Peter. Piping Materials Guide, Elsevier Science & Technology, 2005. ProQuest Ebook Central, https://ebookcentral.proquest.com/lib/uspto-ebooks/detail.action?docID=226801. pp. 177-183 (Year: 2005).*

J. Carvill, Mechanical Engineer's Data Handbook, 1993, Butterworth-Heinemann, pp. 211-212.

Office Action dated Dec. 1, 2022 from U.S. Appl. No. 17/873,391.

Int'l Search Report Dated Oct. 19, 2021 from Int'l Appl. No. PCT/US2021/040597.

Office Action dated Nov. 5, 2021 from U.S. Appl. No. 16/994,271.

Amendment dated Feb. 4, 2022 from U.S. Appl. No. 16/994,271.

Final Office Action dated May 19, 2022 from U.S. Appl. No. 16/994,271.

Amendment After Final dated Jun. 30, 2022 from U.S. Appl. No. 16/994,271.

Office Action dated Nov. 25, 2022 from U.S. Appl. No. 16/994,271.

Amendment dated Feb. 27, 2023 from U.S. Appl. No. 16/994,271.

First Examination Report received on Dec. 15, 2023 from Saudi Arabian Patent Application No. 523442542.

Supplementary Partial European Search Report received on Feb. 7, 2024 from European Patent Application No. 21856399.7.

International Preliminary Report on Patentability dated Jan. 12, 2023 from PCT International Application No. PCT/US2021/040597.

Advisory Action dated Jul. 27, 2022 from U.S. Appl. No. 16/994,271.

Final Office Action dated Jun. 2, 2023 from U.S. Appl. No. 16/994,271.

Request for Continued Examination and Amendment Under 37 C.F.R. § 1.114 dated Sep. 5, 2023 from U.S. Appl. No. 16/994,271.

Office Action dated Nov. 21, 2023 from U.S. Appl. No. 16/994,271.

Amendment dated Feb. 21, 2024 from U.S. Appl. No. 16/994,271.

Extended European Search Report dated Apr. 16, 2024 from European Patent Application No. 21856399.7.

Article 34 Amendments dated Jun. 14, 2022 from International Patent Application No. PCT/US2021/040597.

Final Office Action dated May 29, 2024 from U.S. Appl. No. 16/994,271.

Amendment After Final dated Jul. 29, 2024 from U.S. Appl. No. 16/994,271.

First Examination Report dated Jun. 18, 2024 from Vietnamese Patent Application No. 1-2023-00913.

* cited by examiner

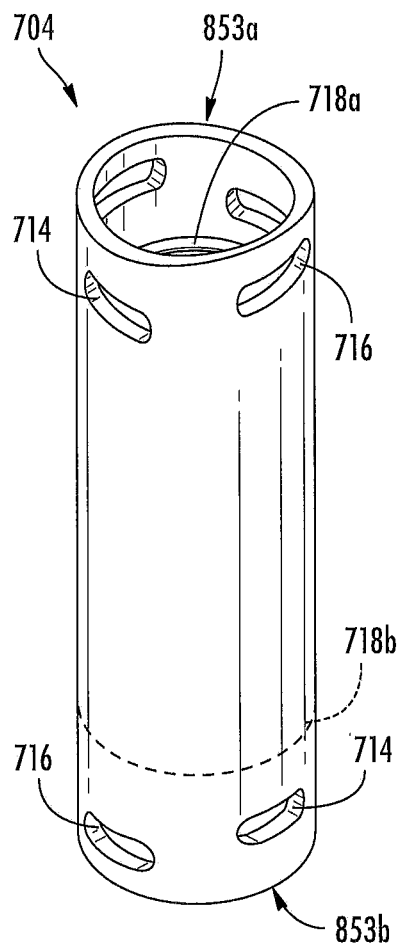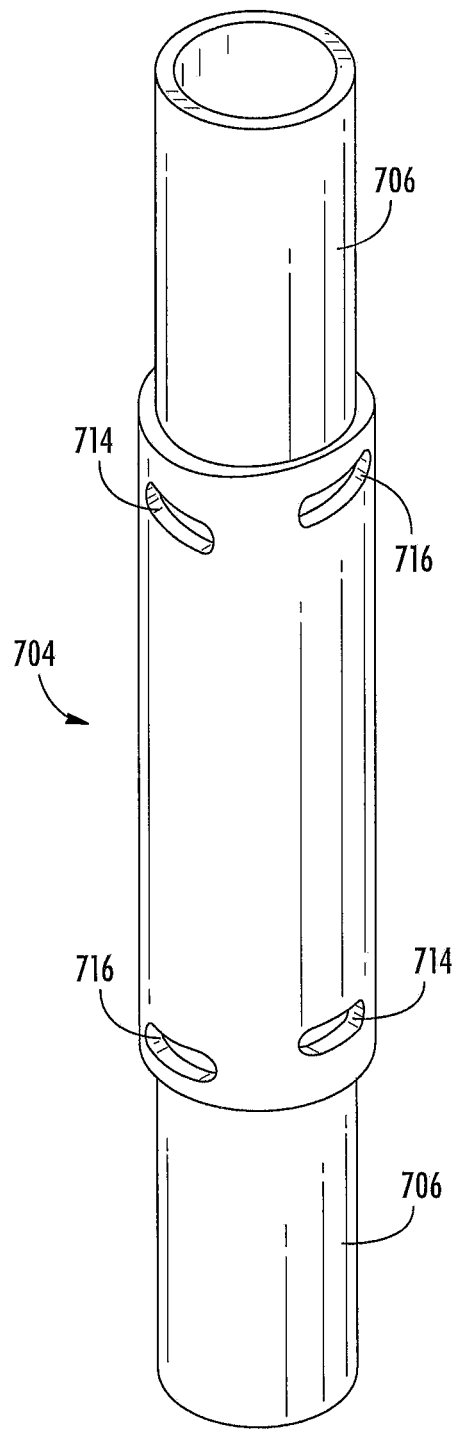
FIG. 7A
FIG. 7B

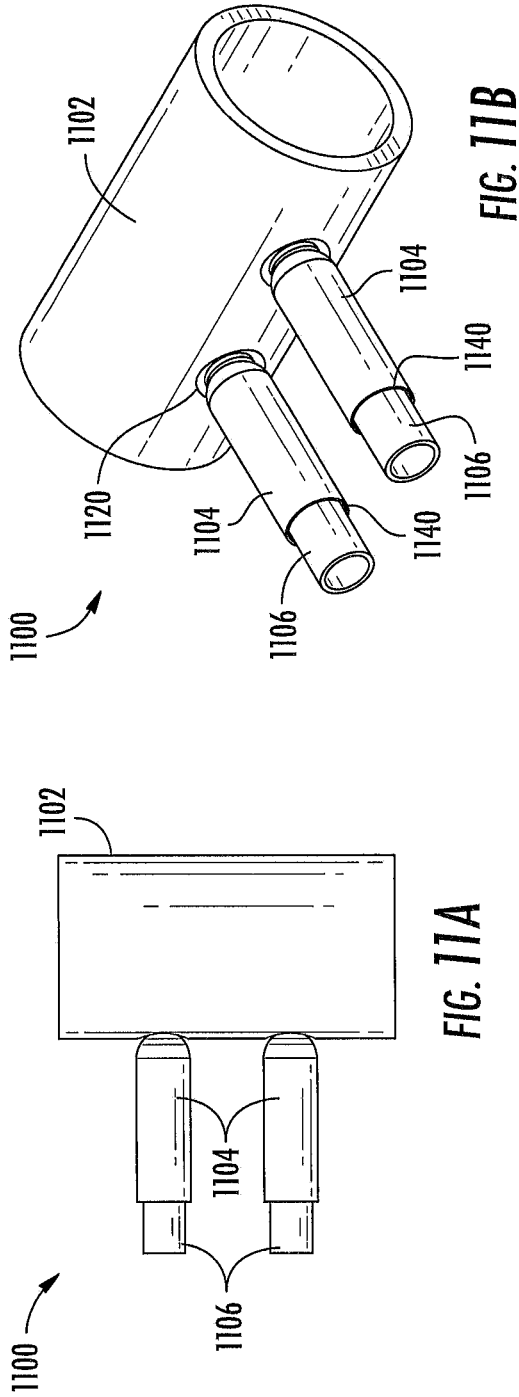
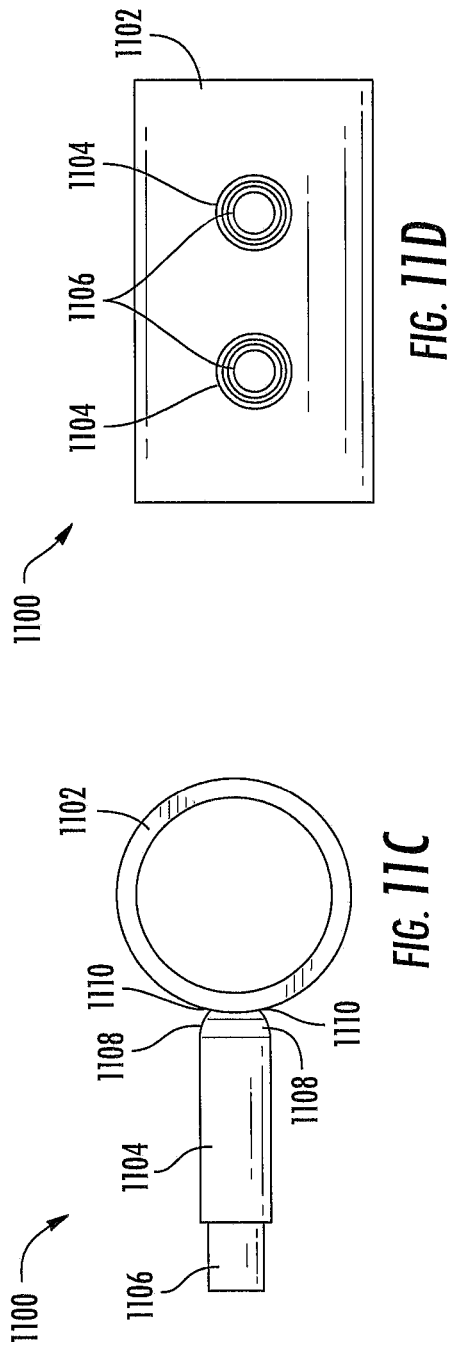

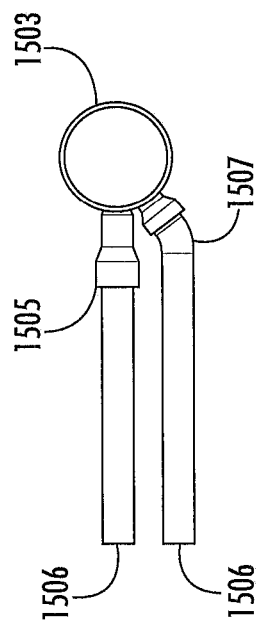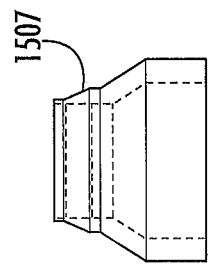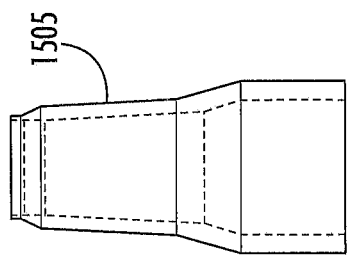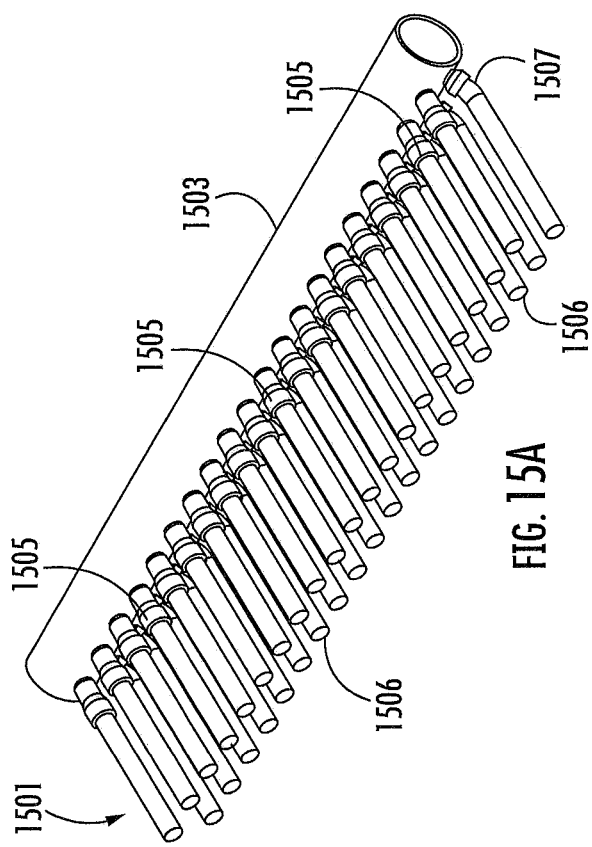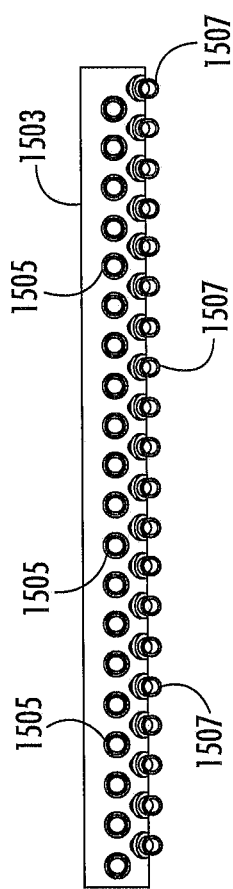

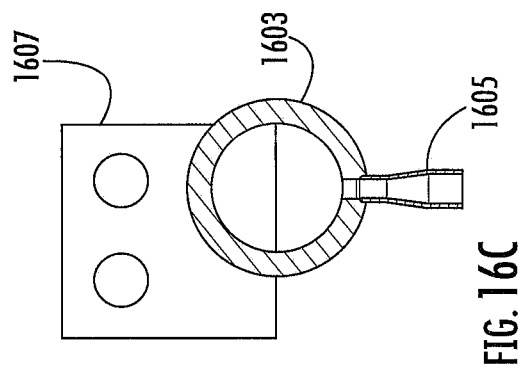
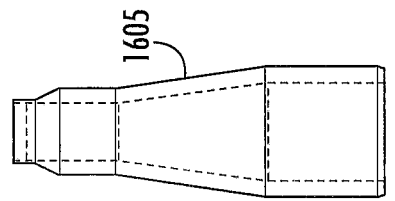
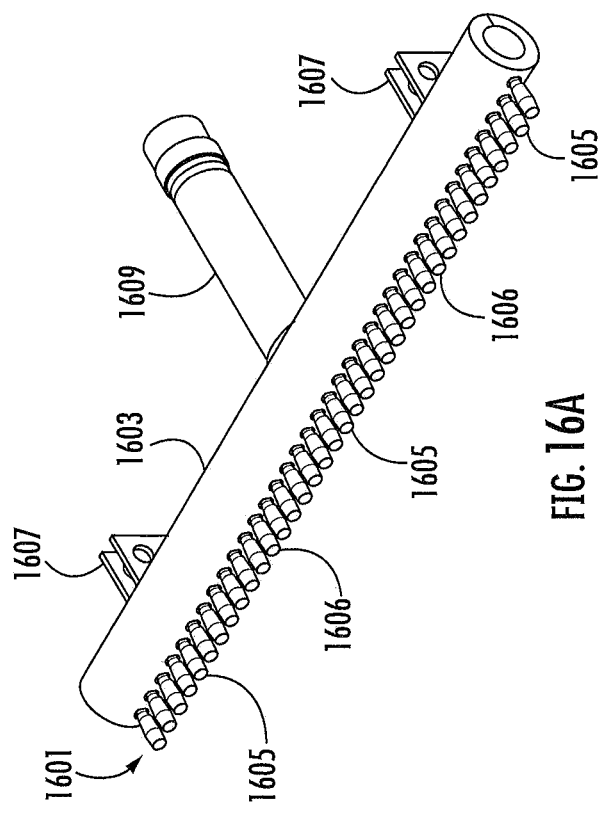
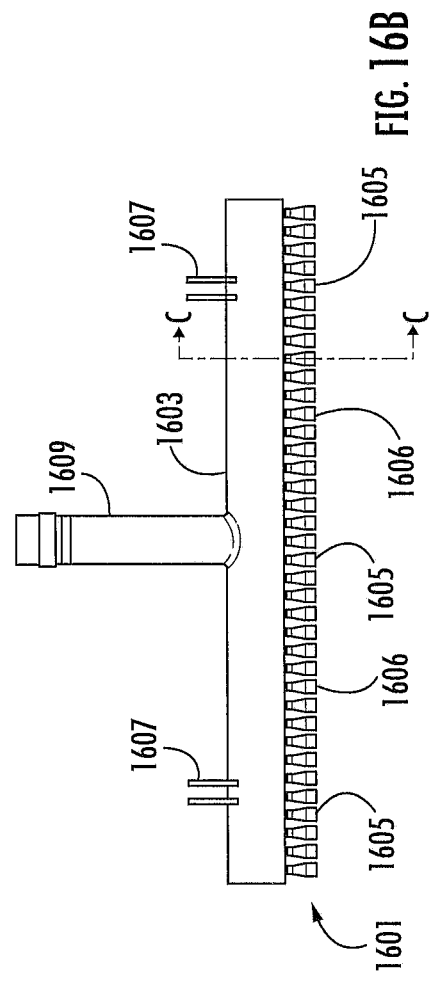

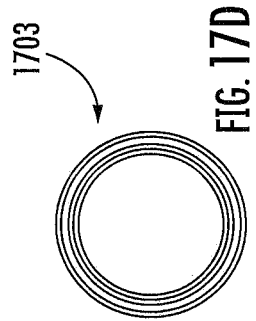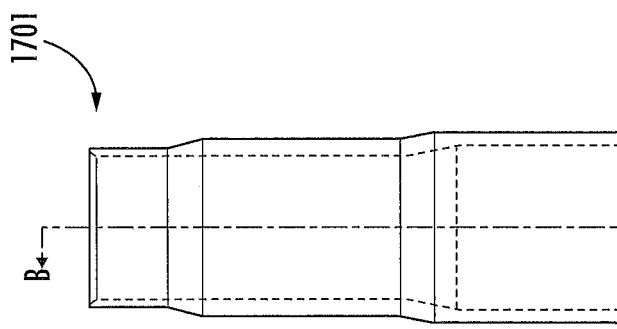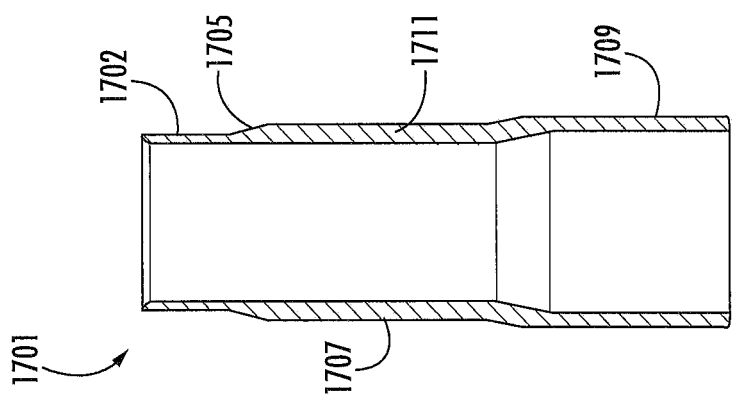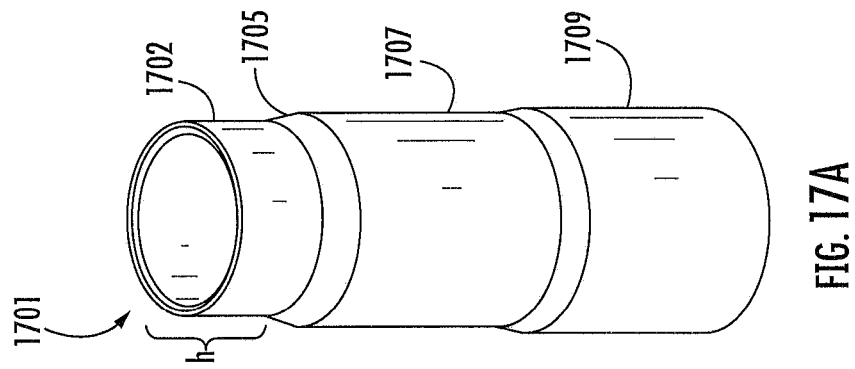

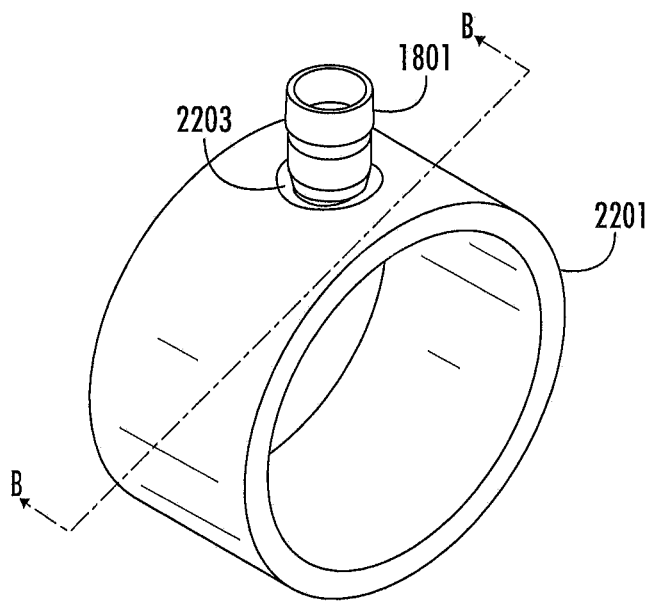
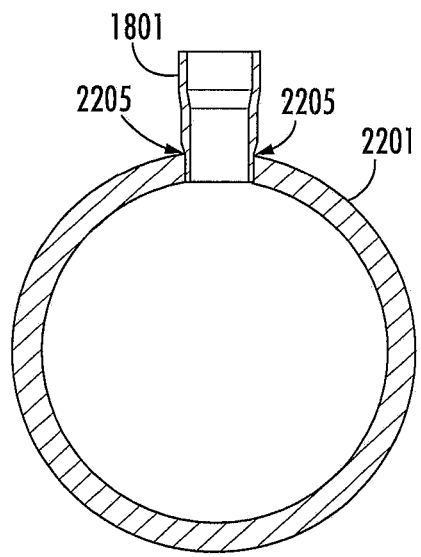
FIG. 22A
FIG. 22B
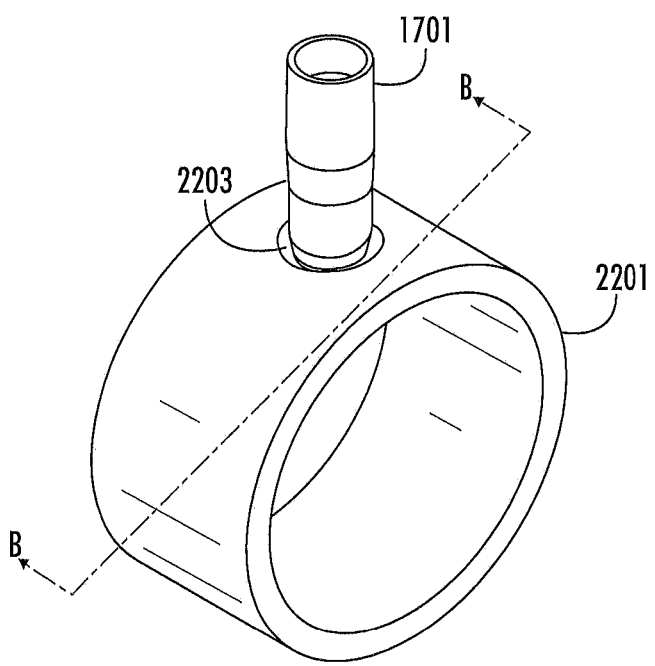
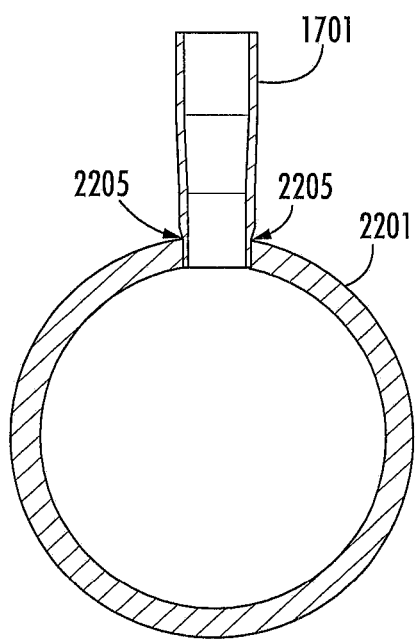
FIG. 23A
FIG. 23B

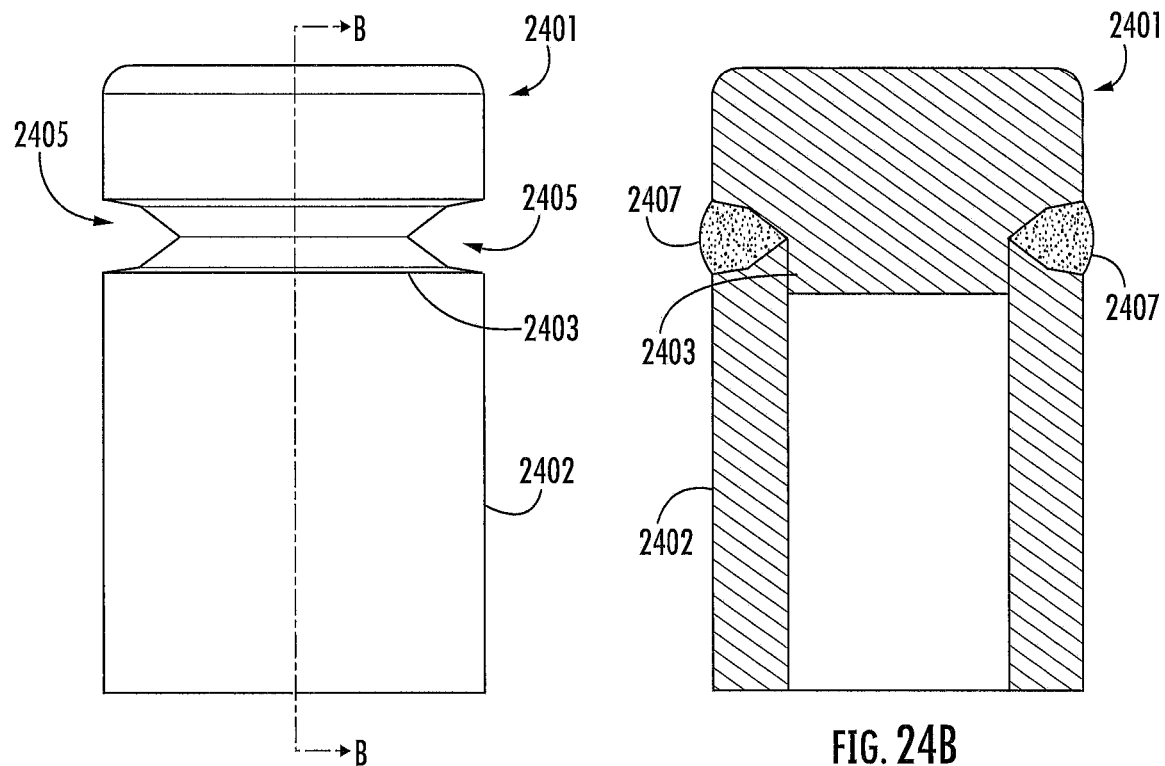
FIG. 24A
FIG. 24B
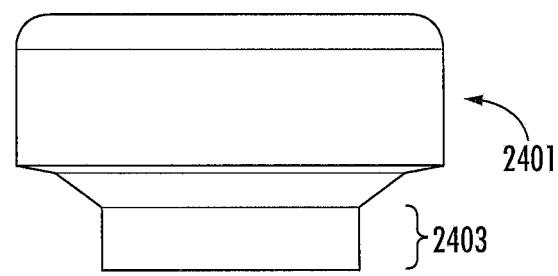
FIG. 24C

TUBE TRANSITION

This application is a continuation-in-part of U.S. patent application Ser. No. 16/994,271, filed 14 Aug. 2020, titled "Tube Transition," and a continuation of PCT Application No. PCT/US2021/040597, filed 7 Jul. 2021, titled "Tube Transition," both of which are incorporated by reference herein for all purposes.

BACKGROUND

1. Field of the Invention

The present application relates to tube transitions. In particular, the present application relates to heat exchanger tube transitions.

2. Description of Related Art

Currently, heat exchangers incorporate multiple types of material and material thicknesses in order to facilitate the varied uses of the heat exchanger. For example, thick materials are used in headers to transport large quantities of fluid, including steam, water, and air, and are often made of sturdy, long-lasting metals. The materials used for tubing to transfer heat to/from a heat exchange fluid often have higher heat transfer coefficients, and thus have smaller wall thicknesses and different material compositions. For example, in a heat recovery steam generator (HRSG), the headers may have larger wall thicknesses than the wall thicknesses of the heat exchange tubing.

In gas turbine combined cycle (GTCC), integrated gasification combined cycle (IGCC), and other combined cycle (CC) power plants, an HRSG may be used to optimize the thermal and overall efficiencies of the plant. Because power plants are heavily regulated to ensure safety, reliability, and environmental compatibility, repairing, replacing, and testing parts in the HRSG is time consuming, expensive, and tedious, requiring significant man-power, delays, and valuable resources. In addition to the regulations, certifications, and testing of repairs, the space required for repairing and replacing parts is also limited, making the necessary repairs even more time consuming and expensive.

Current procedures used to repair power plant HRSGs due to corrosion fatigue failures include welding, weld purging, and radiographic testing. Although welding is generally recognized as a sturdy, reliable form of repair, there are many different types of welds, including lap joint welds, tee joint welds, edge joint welds, and butt welds, and different ways of making those welds, such as through the use of MIG or Gas Metal Arc Welding (GMAW), TIG or Gas Tungsten Arc Welding (GTAW), Stick or Shielded Metal Arc Welding (SMAW), energy beam welding (EBW), and other known methods and manners of making welds. Some of the different types of welds require greater precision, certification, time, training, and testing to properly make and use. For example, according to the American Society of Mechanical Engineers (ASME) standards, an R-Stamp certification enables one to manufacture and repair pressure vessels, an S-Stamp certification enables one to fabricate and repair power boilers, power piping, and ASME pressure retaining parts, and the U-Stamp certification enables one to manufacture and repair unified pressure vessels like blowdown tanks, hot water storage tanks, and accumulators.

Groove welds, such as butt welds, are used to form a circumferential joint between pipes having similar outer diameters, and require chamfering and/or beveling edges of the surfaces to be joined. Butt welds are generally high-quality welds, but are among the most difficult to get right due to multiple problems that may arise when making the weld. For example, some problems that may arise include, but are not limited to, an incomplete penetration of the weld, an incomplete joint penetration, excessive reinforcement, excessive slag formation along an inner surface of a pipe, back gouging, excessive porosity, excessive slag formation in the weld, and incorrect groove sizes. Butt welds in HRSGs are among the most time-consuming welds due to limited access to make a weld and due to the time required to perform X-ray testing. For instance, a cracking weld in need of repair may be suspended 60-90 feet above the ground floor, requiring a scaffold to be erected prior to accessing the broken tube/weld. Due to the compact arrangement of tubes, sometimes sections of header transport pipe that connect the tubes must be removed in order to physically access the broken tube/weld. Fixing tube welds may require a first phase of butt welding, and then replacing cut-out header section(s) may require additional phases of butt welding.

Although the aforementioned methods of making, repairing, and testing heat exchanger headers and tubes represent great strides in the field of heat transfer and tube transitions, many shortcomings remain.

Hence, there is a need for a tube transition in heat exchangers that may simplify the repairing, replacing, and testing procedures, while optimizing cost and resource allocation.

DESCRIPTION OF THE DRAWINGS

The novel features believed characteristic of the invention are set forth in the appended claims. However, the invention itself, as well as a preferred mode of use, and further objectives and advantages thereof, will best be understood by reference to the following detailed description when read in conjunction with the accompanying drawings, wherein:

FIG. 7A is a perspective view of another alternative embodiment of a tube transition, according to the present application;

FIG. 7B is a perspective view and partial assembly view of the tube transition of FIG. 7A;

FIG. 11A is top-side partial view of an alternative embodiment of a header and tube transition, according to the present application;

FIG. 11B is a perspective view of the header and tube transition of FIG. 11A;

FIG. 11C is a right-side view of the header and tube transition of FIG. 11A;

FIG. 11D is a bottom view of the header and tube transition of FIG. 11A;

FIG. 15A is a perspective view of a header and tube transitions, according to an alternative embodiment of the present application;

FIG. 15B is a front view of the header and tube transitions of FIG. 15A;

FIG. 15C is a right-side view of the header and tube transitions of FIG. 15A;

FIG. 15D is a side view of a first type of tube transition of FIG. 15A;

FIG. 15E is a side view of a second type of tube transition of FIG. 15A;

FIG. 16A is a perspective view of an inlet header and tube transitions, according to an alternative embodiment of the present application;

FIG. 16B is a top view of the inlet header and tube transitions of FIG. 16A;

FIG. 16C is a cross-sectional view of the inlet header and tube transitions of FIG. 16A taken at C-C of FIG. 16B;

FIG. 16D is a front view of a tube transition of FIG. 16A;

FIG. 17A is a perspective view of a tube transition according to an alternative embodiment of the present application;

FIG. 17B is a cross-sectional view of the tube transition of FIG. 17A taken at B-B of FIG. 17C;

FIG. 17C is a front view of the tube transition of FIG. 17A;

FIG. 17D is a top view of the tube transition of FIG. 17A;

FIG. 22A is a perspective view of a header and short tube transition, according to an alternative embodiment of the present application;

FIG. 22B is a cross-sectional view of the header and short tube transition of FIG. 22A taken at B-B of FIG. 22A;

FIG. 23A is a perspective view of a header and long tube transition, according to an alternative embodiment of the present application;

FIG. 23B is a cross-sectional view of the header and long tube transition of FIG. 23A taken at B-B of FIG. 23A;

FIG. 24A is a front view of a tube with a plug, according to an alternative embodiment of the present application;

FIG. 24B is a cross-sectional view of the tube with a plug of FIG. 24D taken at B-B of FIG. 24D;

FIG. 24C is a front view of the plug of FIG. 24A; and

FIG. 24D is a front view of a tube with a plug, according to an alternative embodiment of the present application.

Figure 1B:
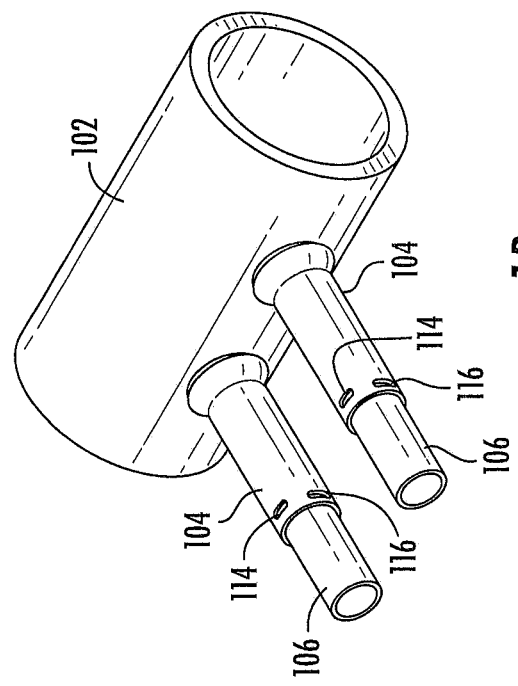
FIG. 1B is a perspective view of the header and tube transition of FIG. 1A.
Figure 1D:
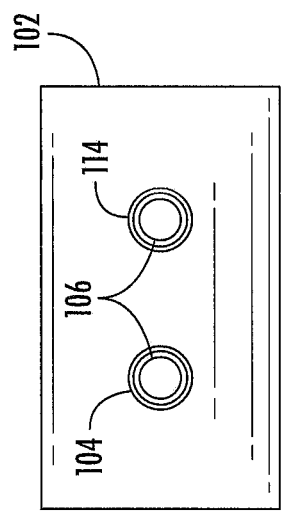
FIG. 1D is a back-side view of the header and tube transition of FIG. 1A.
Figure 1A:
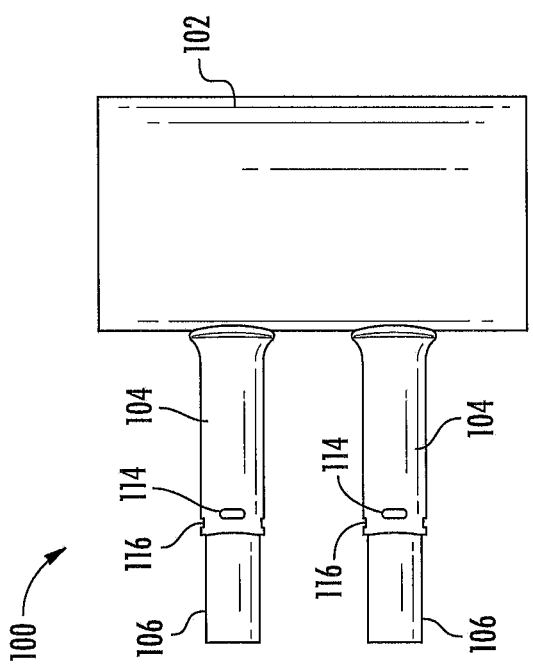
FIG. 1A is top-side partial view of a header and tube transition, according to the present application.

While the assembly of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Heat exchangers are key components in the systems and processes in which they are used. For example, the heat recovery steam generator (HRSG) is one of a few components in a CC power plant that is selectively tailored for its intended use. Because the design is so highly design-specific, and because it acts as a bridge between the two main cycles of a CC power plan, the Brayton Thermal Cycle (top cycle) and the Hirn-Rankine Cycle (bottoming cycle), any change in the design of the HRSG directly affects the efficiency and operability of the entire plant.

The tube transition assembly, methods, and apparatuses disclosed herein generate more efficient plant operations by redesigning tube to header transitions. The redesign offers several advantages, including but not limited to, the following: 1) provides simplified connections and processes for making the connections of tube transitions, 2) provides an assembly designed to minimize detrimental expansion effects due to heat, 3) reduces or eliminates post-weld heat threats (PWHT), 4) utilizes methods that reduce or eliminate weld purging, such as argon purging, 5) utilizes methods that reduce or eliminate the need for radiographic testing, such as X-ray testing, 6) reduces or eliminates the need for erecting scaffolding to access cracking or broken welds located at tube transition points, such as tube-to-header transitions, 7) reduces or eliminates the need for highly expensive certified welders, by allowing more simplified, easy, reliable connection means and welds to be used instead of more tedious, expensive welds, 8) optimizes the size or surface area of the heat affected zone (HAZ), and 9) optimizes the thermal diffusivity of the base material used in creating welds.

In a preferred embodiment, the connection means for connecting the components of the transition tube assembly include welds formed using certified welding techniques. Among the various types of welds that may be used, it is important to note that fillet welds are a much quicker weld than butt welds because they usually do not require edge preparation, like chamfering. Plug/slot welds are also quick and reliable welds. Therefore, a majority of the connection means used herein are fillet and/or plug/slot welds, greatly reducing the time required to make and use the necessary connections of the assembly. It is further noted that although all welds are performed by certified welders, the degree of certification required is not as high as with other manufacture, repair, and replacement methods and procedures (i.e., that do not use the tube transition methods and apparatuses disclosed herein), allowing for more efficient allocation of resources.

Due to the size of HAZ associated with oxyfuel welding, and the resources required for laser beam and electron beam welding, the preferred welding techniques herein include arc welding techniques. The heat input from arc welding may be expressed as $Q=(V \times I \times 60/S \times 1000) \times \text{Efficiency}$ (1), where Q is heat input (kJ/mm), V is voltage, I is current (A), and S is the welding speed (mm/min). The efficiency of Equation (1) depends on the type of weld. For example, shielded metal arc welding and gas metal arc welding have an efficiency value of 0.8, whereas gas tungsten arc welding has a value of 0.6.

Referring to FIGS. 1A-1D in the drawings, a tube transition assembly 100 is illustrated. Tube transition assembly 100 has a header portion 102, a tube transition fitting 104, and a heat exchange tube 106.

The header portion 102 is preferably a large diameter, non-corrosive pipe. Alternatively, the header portion 102 comprises square tubing, rectangular tubing, an irregularly shaped encasing material, and other header shapes and designs known in the art.

In a preferred embodiment, the header portion 102 is made of material(s) depending on its application, including, but not limited to, ductile iron pipe (e.g., ANSI/AWWA C151/A21.51-09), carbon steel, stainless steel pipe (e.g., ANSI schedule 40, ASTM A53, or ASME SA53, etc.), steel that is galvanized, boronized, resulfurized, rephosphorized, or steel that includes chromium, vanadium, nickel, manganese, or molybdenum, and other steel or metal pipe types comprising similar compositions and/or alloys.

A thickness of the header portion 102 may vary depending on intended use. For example, in at least one embodiment, the thickness of the header portion 102 is about 0.2 to 0.5 inches (0.51 to 1.27 mm) in wall thickness. In other embodiments, such as with HRSGs, wall thicknesses of the header portion 102 range from 0.1 inches (2 mm) to about 3 inches (80 mm) or more. Preferably, the wall thickness of the header portion 102 is about 1.1 inches (2.8 cm). Alternatively, the wall thickness is determined based on a ratio of the inner diameter of the header portion 102 to the inner diameter of the heat exchange tube 106. For example, an inner diameter of the header portion 102 is about 5.50 inches (14.0 cm), and the inner diameter of the heat exchange tube 106 is 1.224 inches (3.1 cm), meaning that a ratio of 4.5 results. In a preferred embodiment, the wall thickness of the header portion 102 is approximately ¼ the ratio of the inner diameter of the header pipe to the inner diameter of the heat exchange tube. Thus, ¼ of the ratio of 4.5 approximates the preferred 1.1 inch (2.8 cm) wall thickness of the header pipe 102. This ratio may be used with different header and/or heat exchange tube diameters to determine appropriate wall thickness of the header pipe. Alternatively, the wall thickness of the header portion 102 may vary depending on desired heat transfer parameters and coefficients, including but not limited to, plant efficiency (n), HRSG surface area, heat recovered (Q), mass flow (m), and overall heat transfer coefficient (U). The ratio may also be used to determine inner diameter of the heat exchange tube.

Generally, the tube transition fitting 104 has one or more wall thicknesses that transition from a first thickness that is greater than or equal to the wall thickness of the heat exchange tube 106, to a second thickness that is less than or equal to a wall thickness of the header portion 102. In at least one embodiment, there is a gradual and continuous transition between the two wall thicknesses, resulting in constantly varying thicknesses along the length/height of the fitting 104. In another embodiment, there is a stepwise, discrete transition between the thicknesses.

The different wall thicknesses of the tube transition fitting 104 create at least two different types of heat transition zones. A first transition zone is a continuously sloping transition zone that is approximated using a wall thickness similar to the wall thickness of the header portion 102. The primary heat transfer mechanism in the first transition zone is conduction from the header portion through a connecting surface of the tube transition fitting. The second transition zone is a discrete, stepping transition zone that is approximated using a wall thickness that is similar to a wall thickness of the heat exchange tube 106. The primary heat transfer mechanism in the second transition zone is convection. In a preferred embodiment, a third transition zone, or a neck portion of the tube transition fitting 104, bridges the first and second heat transition zones of the tube transition fitting 104. The thickness, shape, and formulaic representations of the third transition zone are shaped, dimensioned, and computed to transition from the heat transfer mechanism of conduction to the heat transfer mechanism of convection.

The conduction mechanism, according to Fourier's Law, is expressed as $q=U.A.dt$ (2), which can be expressed as $q=U \cdot A \cdot (T1-T2)$ (3). In Equation (3), q, is the heat transfer in W, J/s, or Btu/hr. Also $U=k/s$, where, k, is the thermal conductivity of a material in W/m·K, W/m·° C., or Btu/(hr·° F.·ft2/ft), s, is the material thickness in meters or feet, and, A, is area in m2 or ft2. The area of an annulus can be expressed as $A=\pi(R2-r2)$ (4), where, R, is the radius of the circle made by the outer circumference of the flange of the tube transition fitting 104 and, r, is the radius of the circle forming the opening in the tube transition fitting 104. Thus, using Equation (4), Equation (3) can be expressed as $q=U \cdot \pi (R2-r2) \cdot (T1-T2)$ (5). Equation (5) is used to optimize the annular area and the amount of heat transfer relative to the flanged end of the tube transition fitting 104. Because thermal conductivity is directly related to the material thickness, s, in a preferred embodiment, the material thicknesses at the head portion of the tube transition fitting is different than the material thicknesses at the scalloped end. For example, preferably the wall thickness at the head of the tube transition fitting is thicker than the wall thickness at the scalloped end.

The convection mechanism may be simplified and encompassed in an equation used to determine an overall heat transfer coefficient of the heat exchanger. For example, the overall heat transfer coefficient, U, can be expressed for an unfinned tube-type heat exchanger as $1/UA=1/hiAi+R"f,i/Ai+In(Do/Di)/2\pi KL+R"f,o/Ao+1/hoAo$ (6), where, h, is the convection heat transfer coefficient, A, is the area of the tube (e.g., $A=\pi \cdot D \cdot L$), R"f,i and R"f,o, are fouling factors experimentally determined or determined from tables, for example, for steam the fouling factor may be 0.0001 (m2·KW), k, is the thermal conductivity such as the Boltzmann constant (W/m·K), and the subscripts, i and o, refer to the inner and outer surfaces of the tubes. It is noted that Equation (6) may change depending on other factors, such as the type of flow (e.g., parallel vs. cross-flow) and if the heat exchanger includes fins. The third transition zone combines the conduction and convection formulaic representations using either addition, subtraction, and/or integration depending on how the third transition zone is formed. For example, Equation (5) is labeled Q1, and Equation (6) is labeled Q2, and because the inner radius is substantially constant throughout a fitting, such as fitting 104, while the outer radius may vary, the heat transfer may be approximated in the third transition zone as the integral from Q1 to Q2 of $h \cdot \pi(R2-r2) \, dR$ (7), h is the height of the fitting 104, and R dR represents constantly changing outer radius of the fitting. Thus, a main factor in the heat transfer of the third transition zone is height, h, of the tube transition fitting.

Preferably, at opposing ends of the fitting 104 a first ratio of the height of the tube transition fitting 104 to a first outer diameter of the tube transition fitting is about 3.3, and a second ratio of the height of the tube transition fitting 104 to a second outer diameter of the tube transition fitting 104 is about 2.4. In at least one embodiment, the ratios range from about two to four over the length/height of the tube transition fitting 104. In a preferred embodiment, the height or length of the tube transition fitting is determined based on the difference between Q1 and Q2. Thus, for greater differences, longer tube transition fittings are used, for smaller differences between Q1 and Q2, shorter tube transition fittings are used. In a preferred embodiment, the length/height of the tube transition fitting 104 is about six inches. Other factors may also affect the length/height of the fitting 104, including but not limited to, the heat input from the specific type of welding used to attach the fitting to the header portion 102 and/or to the heat exchange tube 106. It is important to note that an increase in the area of the fitting significantly affects the heat transfer through the fitting, thus, in some embodiments either the height or the area, or both, are adjusted to optimize the heat transfer mechanism in the third transition zone.

Figure 2B:
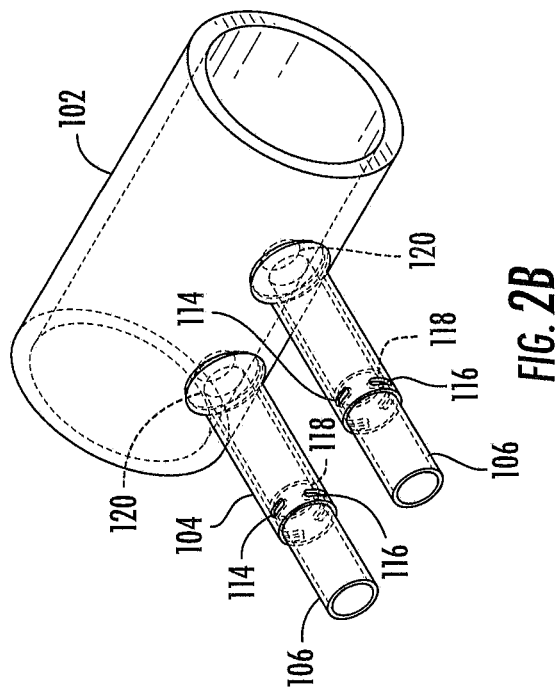
FIG. 2B is a perspective schematic view of the header and tube transition of FIG. 2A.
Figure 2D:
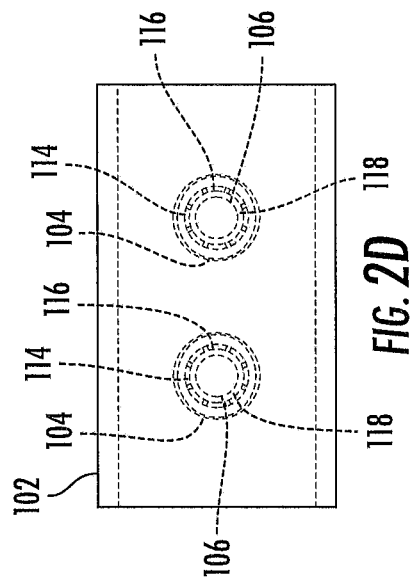
FIG. 2D is a back-side schematic view of the header and tube transition of FIG. 2A.
Figure 2A:
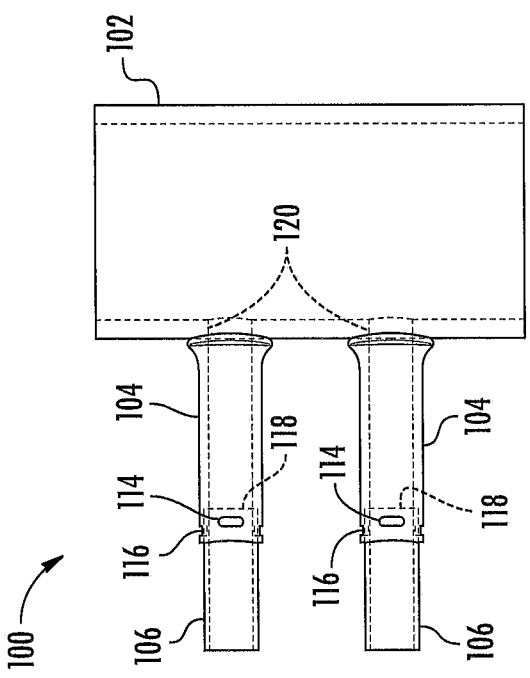
FIG. 2A is top-side partial schematic view of a header and tube transition, according to the present application.
Figure 2C:
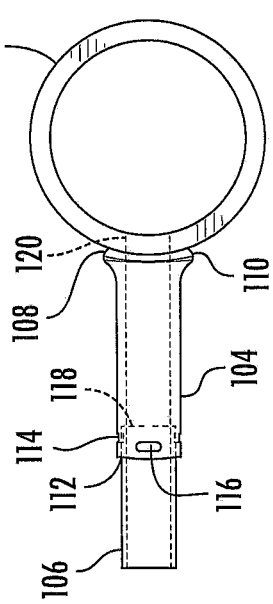
FIG. 2C is a right-side schematic view of the header and tube transition of FIG. 2A.

In a preferred embodiment, the tube transition fitting 104 has at least two inner diameters. The first inner diameter is used to fit an end of the heat exchange tube 106 within an end of the tube transition fitting 104. This first diameter of the tube transition fitting 104 extends along a center axis of the tube transition fitting 104 for a first specified height. The second inner diameter extends along the center axis of the tube transition fitting 104 for a second specified height. In a preferred embodiment, the second specified height is greater than the first specified height. Preferably, the second specified height is greater than the first specified height by a factor of about 5. It is important to note that the location at which the first inner diameter transitions to the second inner diameter of tube transition fitting 104, a tube seat (see element 118 of FIG. 2C, below) is formed.

In a preferred embodiment, the tube transition fitting 104 is shaped to optimize a surface area of the header portion 102 that abuts the fitting. For example, a surface of the tube transition fitting 104 is curved, having a curvature that is substantially equivalent to the curvature of the outer circumference of the header portion 102. By way of another example, the surface of the tube transition fitting 104 is curved having a radius of curvature that is substantially equivalent to a beveled surface adjacent an opening in the header portion 102 (see FIGS. 11A-11D, below). In a preferred embodiment, the radius of curvature is about 3.3 inches (8.4 cm). However, the radius of curvature will vary depending on the dimensions of the header portion 102, such as its outer diameter and radius of curvature. It is noted that the dimensions of the curved, annular shape of the flanged end of the tube transition fitting are determined to optimize conduction from the header portion to the tube transition fitting. Thus, the pre-formed chamfered edges of the flanged end are a fraction of the annulus width.

The head portion 110 of the tube transition fitting 104 has pre-formed chamfered edges. In a preferred embodiment, the chamfered edge is straight and forms an angle of about 36 degrees relative to a vertical axis that runs parallel with a vertical center of the tube transition fitting 104. In other embodiments, the shape and angle of the chamfered edge can be selectively determined based on multiple factors, including but not limited to, a desired weld strength, weld size, or manner of making the weld.

In a preferred embodiment, the heat exchange tube 106 is sized to fit within the tube transition fitting 104. For example, the outer diameter of the heat exchange tube 106 is slightly smaller than the inner diameter of the tube transition fitting 104. The gap between the inner diameter of the tube transition fitting 104 and the heat exchange tube 106 may vary depending on the intended use. In some embodiments, the gap between the inner diameter of the tube transition fitting 104 and the heat exchange tube 106 is less than or equal to 0.06 inches (1.6 mm). In a preferred embodiment, the gap is about 0.02 inches (0.5 mm). Alternatively, the gap is determined based on a ratio of the inner diameter of the tube transition fitting 104 to the outer diameter of the heat exchange tube 106. For example, an inner diameter of the tube transition fitting is 1.52 inches (3.86 cm), and the outer diameter of the heat exchange tube 106 is 1.50 inches (3.81 cm), meaning that a ratio of 1.01 results. Thus, in embodiments, the inner diameter of the tube transition fitting 104 and the gap are determined using the ratio of 1.01 and the outer diameter of the heat exchange tube. The ratio and the inner diameter of the tube transition fitting 104 may also be used to determine the outer diameter of the heat exchange tube 106.

Although the tube transition fitting 104 is shown as curved to fit a rounded pipe, a rectilinear tube transition fitting to fit a square or rectilinear tube is also encompassed by the concepts of the present application. Additionally, although the tube transition fitting 104 is depicted as having a reducing shape or a substantially linear shape, other shapes are encompassed herein, including but not limited to size reduction fittings, T-shaped fittings, 90° elbow fittings, angled fittings, cross-shaped fittings, and other fitting shapes known in the art.

In a preferred embodiment, the heat exchange tube 106 is made of materials including, but not limited to, aluminum, copper, thin low-carbon steel, copper, nickel, drawn/seamless stainless steel, alloy steel pipe, such as AMS 5646, AMS 4070, and combinations thereof. The material and wall thickness of the heat exchange tube 106 will vary depending on intended use. In embodiments, the heat exchange tube 106 comprises drawn/seamless stainless steel, having a wall thickness ranging from about 0.01 to 0.2 inches (0.25 to 5.08 mm). In a preferred embodiment, the heat exchange tube has a wall thickness of about 0.14 inches (3.6 mm). Alternatively, the wall thickness of the heat exchange tube will vary depending on desired heat transfer parameters and coefficients.

Referring now also to FIG. 1B in the drawings, multiple heat exchange tubes 106 and multiple tube transition fittings 104 may be connected to a header portion 102. Although FIG. 1B depicts only two connections to the header portion 102, there may be tens, hundreds, or thousands of connections to the header portion 102.

Figure 1C:
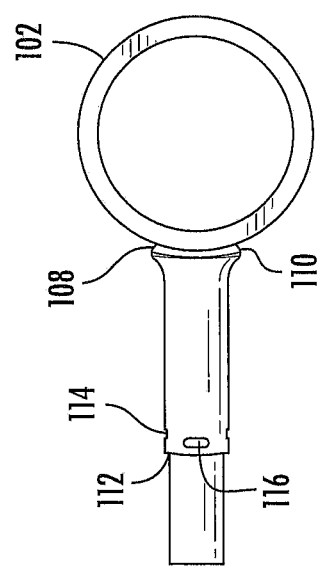
FIG. 1C is a right-side view of the header and tube transition of FIG. 1A.

Preferably, both the tube transition fitting 104 and the heat exchange tube 106 are connected using welds. Referring now to FIG. 1C in the drawings, multiple weld locations are depicted. For example, a first fillet weld location 108 is used to attach the tube transition fitting 104 to the header portion 102. The first fillet weld location 108 may be disposed around an outer circumference of the head portion 110 of the tube transition fitting 104. A second fillet weld location 112 may be disposed around an outer circumference of a scalloped end, which end is opposite the head portion 110 of the tube transition fitting 104. Although a size of the fillet weld may vary, the throat of the weld, or the distance from the inside corner out to the weld surface, should be about as thick as the base metal. (See, FIG. 3C and associated thickness 132, below). It is noted that the scalloped end has a positive effect on the HAZ. (See, FIG. 3C, element 353, below). For example, the HAZ may be smaller with a fillet weld as compared to the HAZ of a butt weld.

Preferably, a first set of plug/slot locations 114 are included in the tube transition fitting 104. A second set of plug/slot locations 116 are included in the tube transition fitting. Preferably, the first set of plug/slot locations 114 differs from the second set of plug/slot locations 116 by at least a distance at which they are located relative to the head portion 110 of the tube transition fitting 104. For instance, the second set of plug/slot locations 116 may be located farther from the head portion 110 of the tube transition fitting 104 than the first set of plug/slot locations 114. Weld tabs may be formed within the sets of plug/slot locations 114, 116 to provide an additional securing mechanism to secure the heat exchange tube 106 to the tube transition fitting 104. Preferably, both a fillet weld and a connection means (e.g., weld tab) within the plug/slot location 114, 116 are used to secure the heat exchange tube 106. Alternatively, only the plug/slot location 114, 116, or only the fillet weld, are used. The type of securing used to attach the heat exchange tube 106 to the tube transition fitting will depend at least on the material composition of the heat exchange tube and the heat exchange fluid flowing through and around the tube.

Although weld tabs are preferably used in the sets of plug/slot locations 114, 116, alternatively, the slots in these locations may coincide with attachment openings (not shown) that are formed in the heat exchange tube 106. The attachment openings may be used for screws, bolts, pins, or similar attachment means, such as when silicon carbide tubing is used. In at least one embodiment, an end of the heat exchange tube 106 that is inserted into the tube transition fitting 104 is threaded to secure it to a threaded interior portion of the tube transition fitting 104.

Referring now also to FIGS. 2A-2D in the drawings, schematic depictions illustrate the inner features and formations of the tube transition assembly 100. For example, an inner channel 120 is formed in the header portion 102 of the assembly. Preferably, the dimensions of the inner channel 120 coincide with the dimensions of the tube transition fitting 104, such as the second inner diameter of the tube transition fitting.

In a preferred embodiment, a tube seat 118 (see also FIG. 4C, below) is formed in the interior of the tube transition fitting 104. The tube seat 118 enables a substantially smooth transition between the inner surface of the heat exchange tube 106 and the inner surface of the tube transition fitting 104. In some embodiments, the tube seat 118 also reduces an amount of exposed, untreated surface area, thereby reducing and/or eliminating a corrosive fatigue effect at this junction.

In at least one embodiment, an end of the heat exchange tube 106 abuts a surface of the tube seat 118 upon assembly of the tube transition assembly 100. In other embodiments, a gap is left between the end of the heat exchange tube 106 and the tube seat 118 in order to account for heat expansion of the heat exchange tube 106. For example, using an expansion table, or algorithms upon which the expansion tables are based, an expansion of the heat exchange tube 106 may be determined. For instance, copper and/or 124 stainless steel tube may experience linear expansion of about 0.1 to 3.0 inches (2.54 to 7.62 cm) per 100 feet of tubing, after exposure to steam having a temperature of about 300° F., depending on the temperature at which the tubing was installed. Therefore, a gap between the end of the heat exchange tube 106 and the tube seat 118 may be determined relative to a predetermined amount of tubing expansion.

Referring now also to FIGS. 3A-3D in the drawings, the tube transition fitting 104 is depicted having the head portion 110, a body portion 301, a transitional neck portion 303, and a circumferential flange 305. Preferably, the tube transition fitting 104 has an opening 122 that is centered along a horizontal axis 124 and a longitudinal axis 126. Alternatively, the opening 122 is slightly skewed relative to the horizontal axis 124 and/or the longitudinal axis 126, in order to angle the heat exchange tube 106 within the tube transition fitting 104.

Figure 3A:
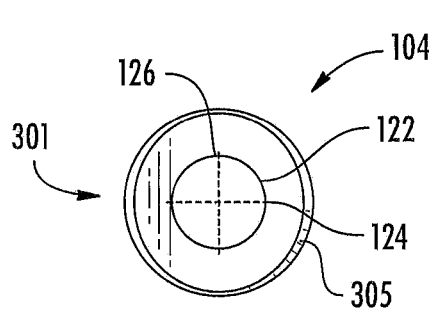
FIG. 3A is top view of a tube transition, according to the present application.
Figure 3B:
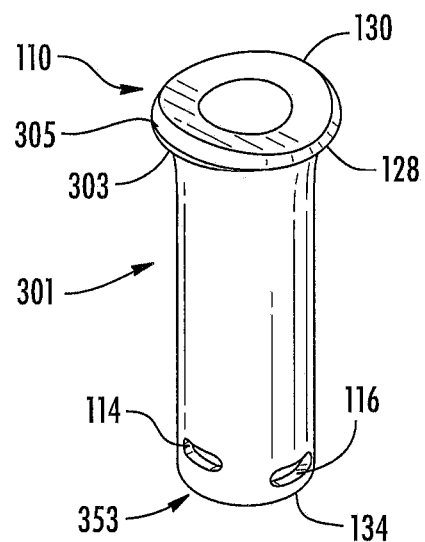
FIG. 3B is a perspective view of the tube transition of FIG. 3A.
Figure 3C:
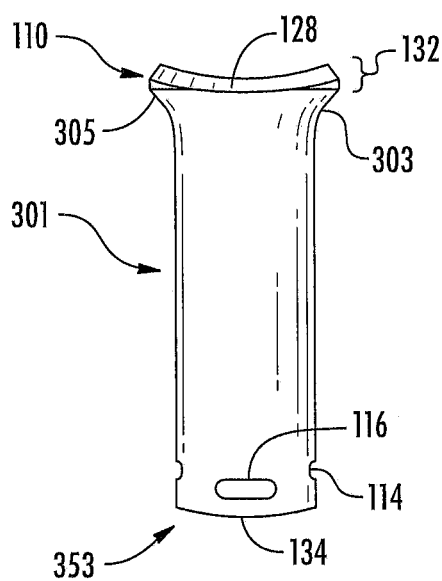
FIG. 3C is a right-side view of the tube transition of FIG. 3A.

Referring to FIG. 3C, the head portion 110 includes a set of depressed portions 128 and a set of raised portions 130. Both the sets of depressed portions 128 and the sets of raised portions 130 are connected by continuously sloping surfaces. The continuously sloping surfaces provide the curved surfaces that provide the connection/abutment between the tube transition fitting 104 and header portion 102.

In a preferred embodiment, the head portion 110 has an associated thickness 132. The associated thickness 132 varies relative to the transitional neck portion 303. The associated thickness 132 may also vary depending on the desired curvature of the continuously sloping surfaces of the head portion 110 and/or depending on the specified curvature of the header portion 102. In at least one embodiment, the associated thickness 132 varies depending on a wall thickness of the fitting 104, where the wall thickness used is a wall thickness that is measured at a point along the length/height of the fitting that is after the location of the tube seat 118 (relative to the scalloped end 353). For example, when the wall thickness is measured to be about three-tenths of an inch at a point that is above the tube seat 118, then the associated thickness 132 is about 1.1 times larger, or is about ⅓ of an inch.

In a preferred embodiment, both the associated thickness 132 and the circumferential flange 305 are variable in dimension depending on its intended use. Because both the associated thickness 132 and the circumferential flange 305 are variable in dimension, and because a fillet weld is preferably used to attach the tube transition fitting 104 to the header portion 102, the connection between the tube transition fitting and the header portion can be made to be very secure without required X-ray testing. Furthermore, PWHT is significantly reduced because the header portion 102 and at least the circumferential flange 305 are much more equivalent in material and thicknesses than previous solutions that do not require the use of tube transition fitting 104.

Figure 3D:
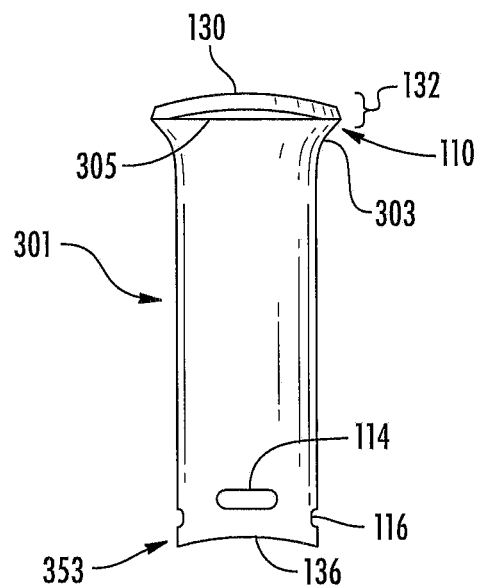
FIG. 3D is a back-side view of the tube transition of FIG. 3A.

Referring to FIGS. 3C and 3D, tube transition fitting 104 has a scalloped end 353. Scalloped end 353 includes a set of raised portions 134 and a set of depressed portions 136. The set of raised portions 134 are connected to the set of depressed portions 136 by continuously sloping surfaces. It is noted that the scalloped end 353 has a positive effect on the HAZ. For example, as a fillet weld may be used to attach the tube transition fitting 104 to the heat exchange tube 106, the scalloped end 353 may significantly reduce an amount of detrimental heat expansion warping that may occur. This may also be the case when only the plug/slot welds are used to secure the scalloped end 353 to the heat exchange tube 106.

In a preferred embodiment, a radius of curvature of the curved, or continuously sloping surfaces that connect the set of raised portions 134 and the set of depressed portions 136 of the scalloped end 353 is equivalent to the radius of curvature of the curved surface of the head portion 110. For example, when the radius of curvature of the curved surface of the head portion 110 of the tube transition fitting 104 is about 3.3 inches (8.4 cm), then the radius of curvature of the scalloped end 353 is about 3.3 inches (8.4 cm).

It is noted that although only two sets of plug/slot locations 114, 116 are shown, multiple additional sets of plug/slot locations may be formed in the tube transition fitting 104. For example, in order to repair of a fillet weld made at the scalloped end 353 of the tube transition fitting 104, the tube transition fitting may be cut, and new sets of plug/slot locations may be formed as well as a new scalloped end. A new tube seat may also be formed in the tube transition fitting. In this regard, the tube transition fitting 104 may vary in length/height, due to and/or allowing for, one or more cuts to be made in the tube transition fitting 104 for repairs to and/or replacement of a fillet weld.

Figure 4A:
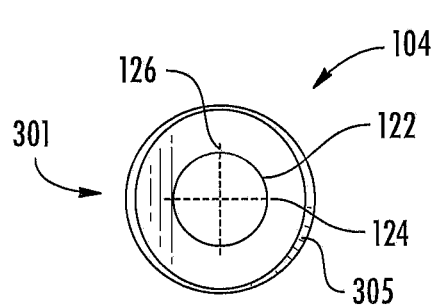
FIG. 4A is top schematic view of a tube transition, according to the present application.
Figure 4B:
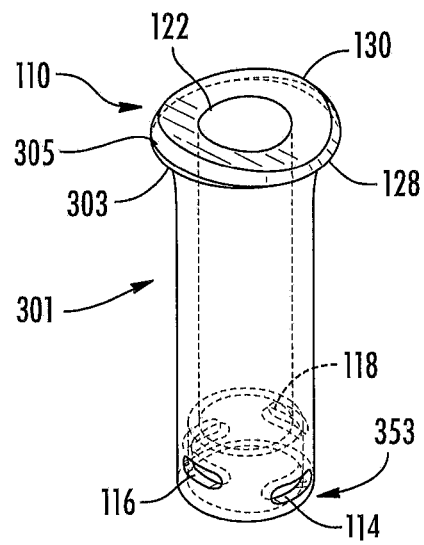
FIG. 4B is a perspective schematic view of the tube transition of FIG. 4A.
Figure 4C:
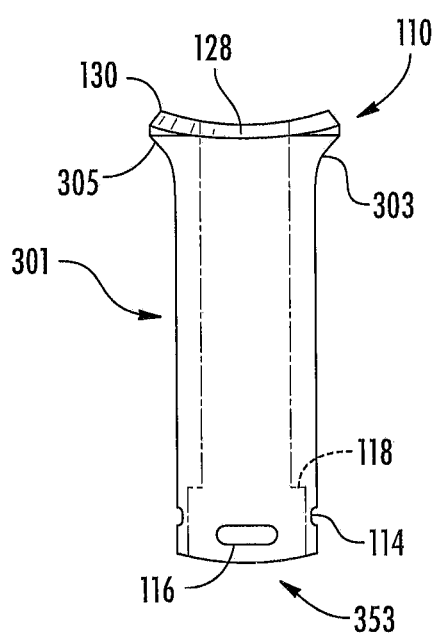
FIG. 4C is a right-side schematic view of the tube transition of FIG. 4A.
Figure 4D:
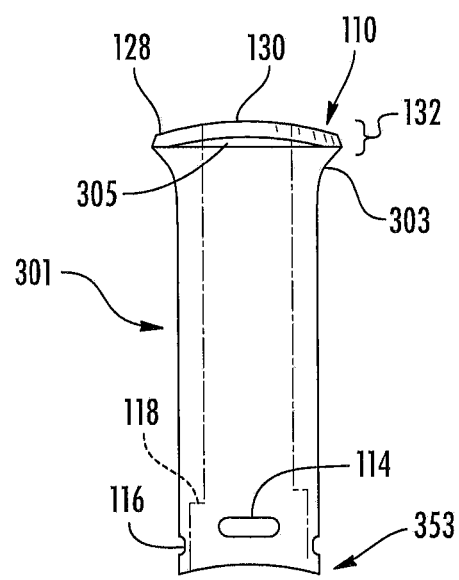
FIG. 4D is a back-side schematic view of the tube transition of FIG. 4A.
Figure 5B:
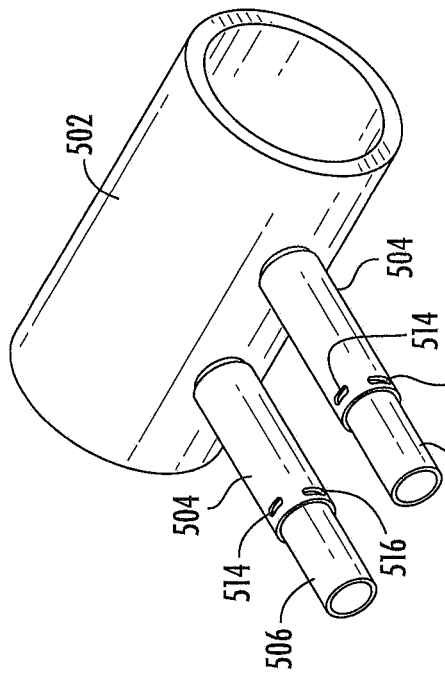
FIG. 5B is a perspective view of the header and tube transition of FIG. 5A.
Figure 5D:
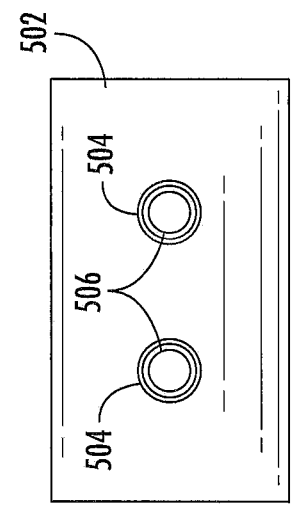
FIG. 5D is a back-side view of the header and tube transition of FIG. 5A.
Figure 5A:
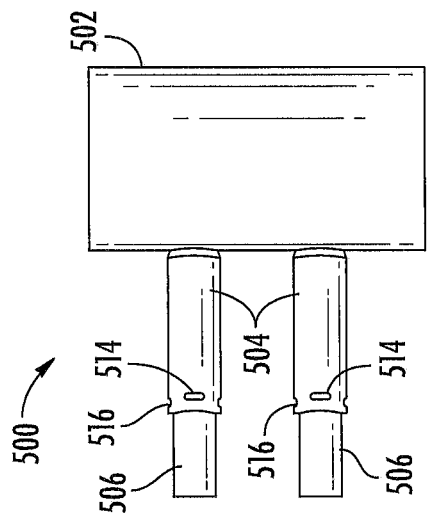
FIG. 5A is top-side partial view of an alternative embodiment of a header and tube transition, according to the present application.
Figure 5C:
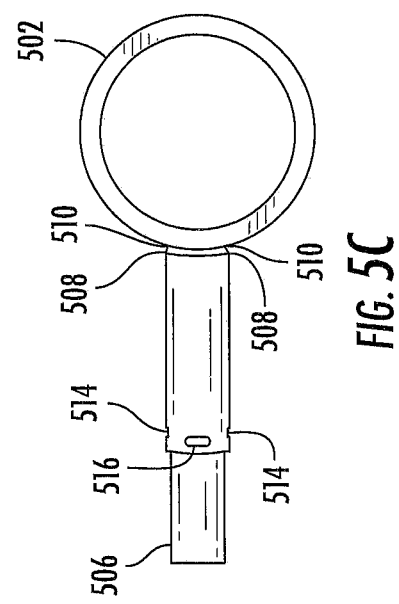
FIG. 5C is a right-side view of the header and tube transition of FIG. 5A.
Figure 6A:
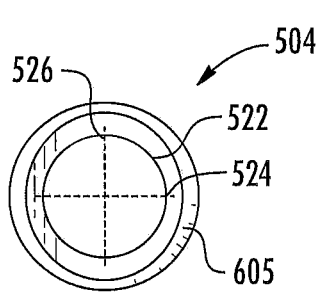
FIG. 6A is top view of an alternative embodiment of a tube transition, according to the present application.
Figure 6B:
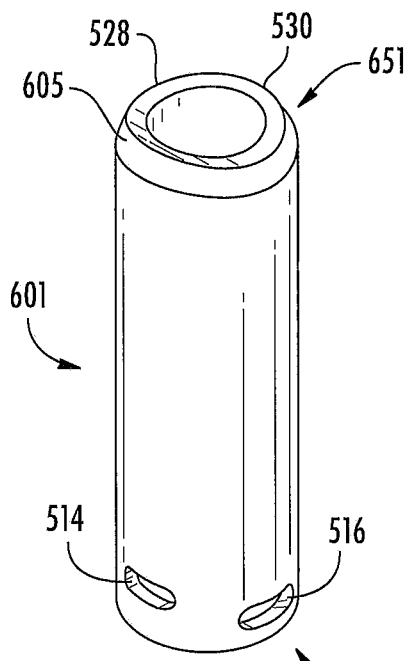
FIG. 6B is a perspective view of the tube transition of FIG. 6A.
Figure 6C:
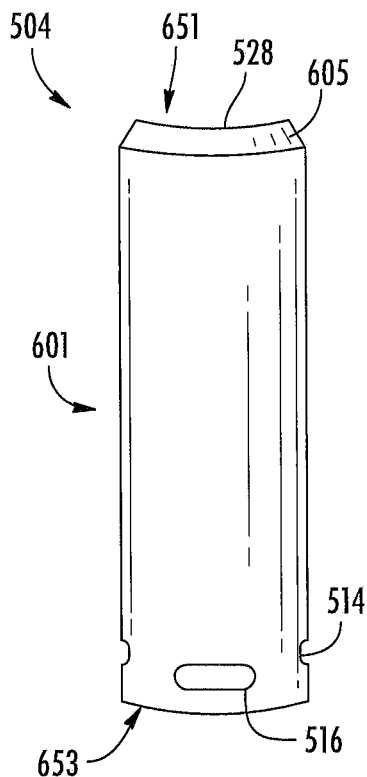
FIG. 6C is a right-side view of the tube transition of FIG. 6A.
Figure 6D:
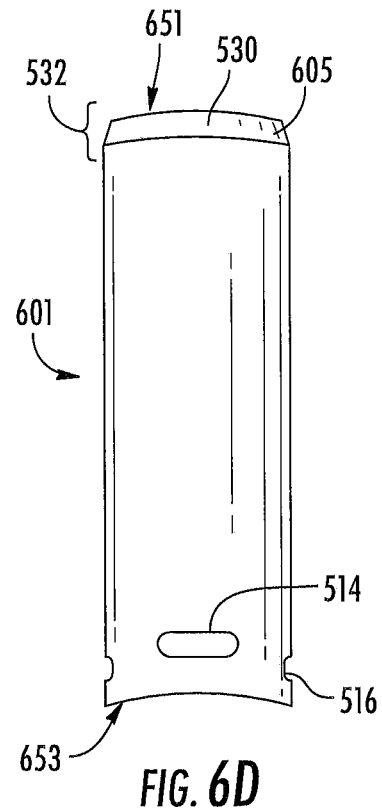
FIG. 6D is a back-side view of the tube transition of FIG. 6A.

Referring now also to FIGS. 4A-4D in the drawings, a schematic view of the tube transition fitting 104 is depicted to illustrate inner features and formations of the fitting. For example, the tube seat 118 is depicted in FIG. 4C. The tube seat 118 is formed in an inner surface of the tube transition fitting 104 at a location that is closer to the head portion 110 than both sets of the plug/slot locations 114, 116. In other words, the plug/slot locations 114, 116 are closer in proximity to the scalloped end 353 than the tube seat 118 is located relative to the scalloped end 353.

Preferably, the slots used for the plug/slot locations 114, 116 are elongated, having a length that is greater than their width. For example, the slots may have a length that is approximately twice as long as the width of the slot is wide. Preferably, the width of the slot for the plug/slot locations 114, 116 approximates the wall thickness of the tube transition fitting 104. For example, a ratio of the width of wall thickness of the tube transition fitting 104 to the width of the slot is about 1.2 for the wall thickness corresponding to the second specified height of the tube transition fitting 104, and about 0.6 for the wall thickness corresponding to the first specified height of the tube transition fitting 104.

Referring now also to FIGS. 5A-5D in the drawings, an alternative embodiment of a header tube transition assembly 500 is illustrated. Tube transition assembly 500 functions similar to the tube transition assembly 100, except that the connection between the header portion 502 and the tube transition fitting 504 is created using a pre-formed chamfered end of the tube transition fitting 504 seated within a pre-formed chamfered opening in the header portion 502. Alternatively, the opening in the header portion 502 is not chamfered.

Preferably, the connection between the tube transition fitting 504 and the heat exchange tube 506 of the tube transition assembly 500 is formed in the same manner as discussed above relative to the tube transition assembly 100. For example, weld tabs may be formed within the sets of plug/slot locations 514, 516 to provide a securing mechanism to secure the heat exchange tube 506 to the tube transition fitting 504.

Preferably, the connection between the tube transition fitting 504 and the header portion 502 creates a substantially unitary transition zone. The substantially unitary transition zone is formed by the circumferential chamfered end of the tube transition fitting 504 being connected to, for example by using a fillet weld, the header portion 502. The primary heat transfer mechanism in the unitary transition zone is conduction from the header portion through a connecting surface of the tube transition fitting. The second transition zone is a discrete, stepping transition zone that approximates a wall thickness of the heat exchange tube 506. The primary heat transfer mechanism in the second transition zone is convection. In a preferred embodiment, a third transition zone, or a body portion 601 (FIGS. 6A-6D below) of the tube transition fitting 504, bridges the first and second transition zones of the tube transition fitting 504. The thickness and shape of the third transition zone is shaped and dimensioned to transition from the primary heat transfer mechanism of conduction to the primary heat transfer mechanism of convection. It is important to note that the third transition zone experiences both conduction and convection—the convection from the heat exchange fluid, and the conduction from the connection between the tube seat and the heat exchange tube 506.

Referring now also to FIGS. 6A-6D in the drawings, preferably, the tube transition fitting 504 has an opening 522 that is centered along a horizontal axis 524 and a longitudinal axis 526. Alternatively, the opening 522 is slightly skewed relative to the longitudinal axis 526 and/or the horizontal axis 524, in order to angle the heat exchange tube 506 within the tube transition fitting 504.

The head portion 530 of the tube transition fitting 504 includes an angled surface 605, a set of depressed portions 528, and a set of raised portions 530. Both the sets of depressed portions 528 and the sets of raised portions 530 are connected by continuously sloping surfaces. The continuously sloping surfaces provide the curved surfaces that provide the connection/abutment between the tube transition fitting 504 and header portion 502. The continuously sloping surfaces have a radius of curvature that is preferably based on the radius of curvature of the header portion 502. For example, the radius of curvature of the chamfered end 651 is the same as the radius of curvature of the inner surface of the header portion 502. Preferably, the scalloped end 653 of the tube transition fitting 504 also has an associated radius of curvature that is similar, if not identical to, the radius of curvature of the chamfered end 651.

The chamfered end 651 has a slope and associated thickness, width, and/or height 612. These features and dimensions are adjusted according to the slope, associated thickness, width, and or height associated with the chamfered opening in the header portion 502. Additional factors may affect these features and dimensions, including a desired type, shape, and strength of a weld to connect the tube transition fitting 504 to the header portion 502.

Referring now also to FIGS. 7A-7B in the drawings, an alternative embodiment of a tube transition fitting is depicted as fitting 704. Preferably, the tube transition fitting 704 includes two tube seats 718a and 718b and two scalloped ends 853a and 853b. Tube transition fitting 704 is useful in repairing cracks or leaks along intermediate lengths of the heat exchange tube 106, 506, or 706. For example, a leaking intermediate section of a heat exchange tube 706 is cut above and below the leak in the tube 706. Due to the length/height of the heat exchange tube 706, there is enough "play" to angle the tube 706 away from the cut-out section, slide the tube transition fitting 704 onto the tube 706, angle the tube 706 back towards the cut-out section, and then slide the tube transition fitting 704 into place to overlap both ends of the tube 706 and cover the cut-out section (see FIG. 7B). The tube transition fitting 704 is then secured using fillet welds and weld tabs in the plug/slot locations 714, 716.

Figure 8A:
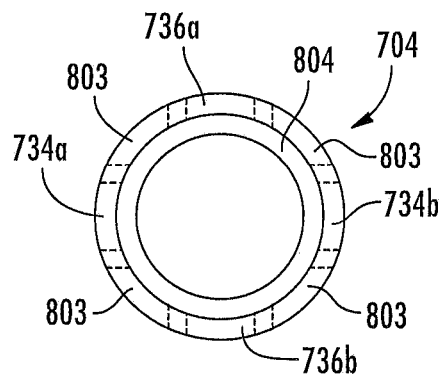
FIG. 8A is top schematic view of the tube transition of FIG. 7A.
Figure 8B:
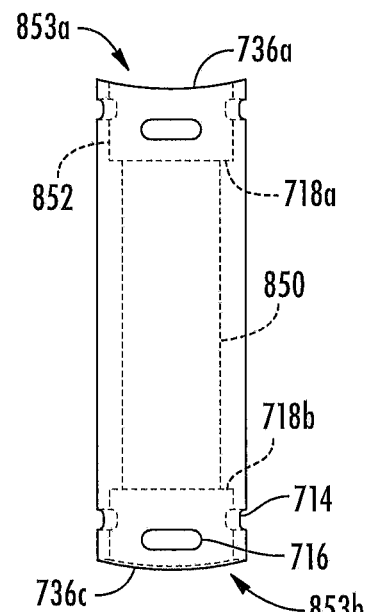
FIG. 8B is a right-side schematic view of the tube transition of FIG. 7A
Figure 8C:
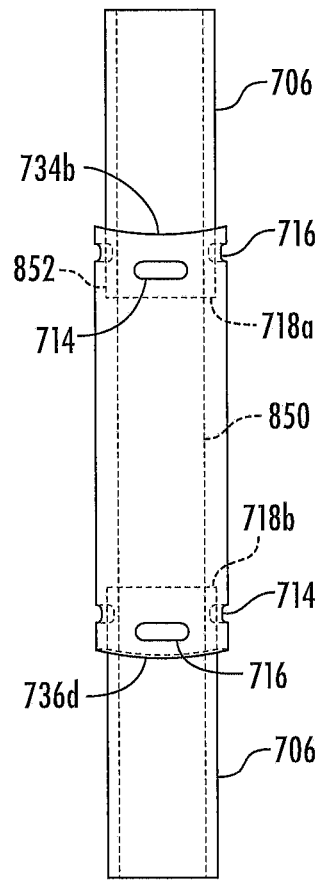
FIG. 8C is a right-side schematic view of the tube transition of FIG. 7B.
Figure 8D:
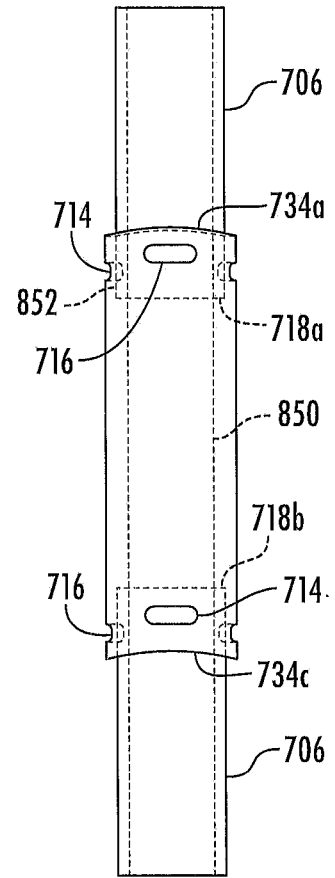
FIG. 8D is a left-side schematic view of the tube transition of FIG. 7B.

Referring now also to FIGS. 8A-8D in the drawings, a schematic view of the tube transition fitting 704 is depicted to illustrate inner features and formations of the fitting. For example, the tube seats 718a and 718b are depicted in FIGS. 8B-8D. FIG. 8A depicts broken lines that coincide with the plug/slot locations 714, 716. Positioned above the plug/slot locations 714, 716, as depicted in FIG. 8A, are curved or continuously sloping transitional surfaces 803 that connect the set of raised portions 834a, 834b and the set of depressed portions 836a, 836b of the scalloped end 853a. Corresponding sets of raised portions 834c, 834d (not shown) and depressed portions 836c, 836d are formed in the lower scalloped end 853b. The tube seats 718a and 718b are formed in an inner surface of the tube transition fitting 704 at a location that is farther from the scalloped end 853 than both sets of the plug/slot locations 714, 716. In other words, the plug/slot locations 714, 716 are located between the tube seat 718 and the scalloped end 853.

In a preferred embodiment, the tube seats 718a, 718b are formed at a location that is at least one inch from the respective raised portions 834 of the respective scalloped end 853. In other embodiments, the location of a tube seat is linearly dependent on a location and size of plug/slot location 714, 716. For example, for a ¼-inch tall, ½-inch wide plug slot, at least ⅜-inch remains between the tube seat and the center of the closest plug slot location 714, 716. Similarly, for a ½-inch tall, 1-inch wide plug slot, at least ¾-inch remains between the tube seat and the center of the closest plug slot location. In at least one embodiment, the location of the tube seat is dependent on the location and size of the plug/slot location 714, 716 according to a non-linear function.

Preferably, the tube transition fitting 704 can be formed for small-, mid-, and large-scale applications. For example, in each application, the tube transition fitting 704 has at least two wall thicknesses 850 and 852, where the first wall thickness 850 is greater than the second wall thickness 852. In the small-scale application, the tube transition fitting 704 has a wall thickness 852 ranging from about 0.01 to 0.2 inches (0.25 to 5.08 mm). In a mid-scale application, the tube transition fitting has a wall thickness ranging 852 from about 0.2 to 0.25 inches (5.08 to 6.35 mm). In a large-scale application, the heat exchange tube transition fitting 704 has a wall thickness greater than 0.25 inches (6.35 mm). Alternatively, the wall thickness of the tube transition fitting 704 will vary depending on desired heat transfer parameters and coefficients. In each of the small-, mid-, and large-scale applications, the wall thickness 850 is about two times larger than the wall thickness 852.

Referring now also to FIGS. 9A-9D in the drawings, an alternative embodiment of a header tube transition assembly 900 is illustrated. Tube transition assembly 900 functions similar to the tube transition assembly 100, except that the connection between the header portion 902 and the tube transition fitting 904 is created using a pre-formed chamfered end of the tube transition fitting 904 and one or more external tube seats 918 seated within an opening in the header portion 902. It is important to note that the external tube seats 918 are external relative to the tube transition fitting 904, not relative to the connection between the fitting and the header portion 902. Preferably, both the tube transition fitting 904 and the heat exchange tube 906 are connected using welds.

Figure 9B:
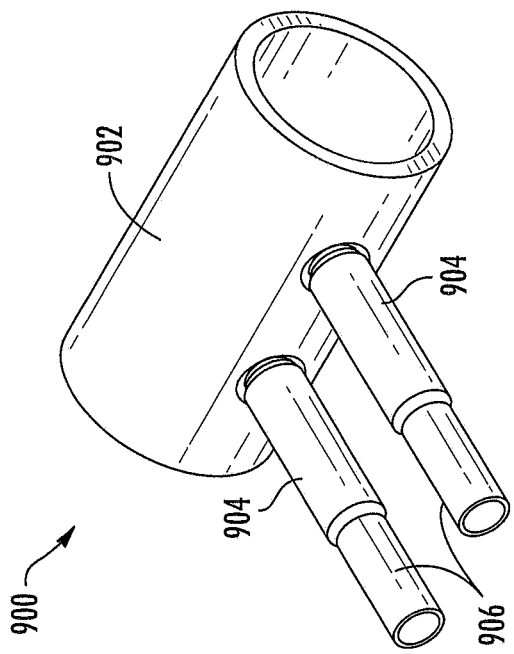
FIG. 9B is a perspective view of the header and tube transition of FIG. 9A.
Figure 9D:
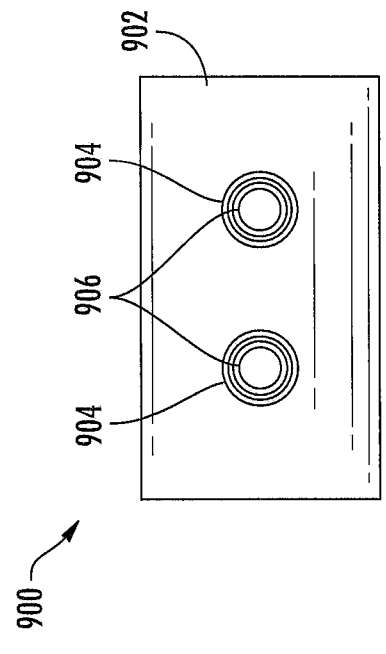
FIG. 9D is a bottom view of the header and tube transition of FIG. 9A.
Figure 9A:
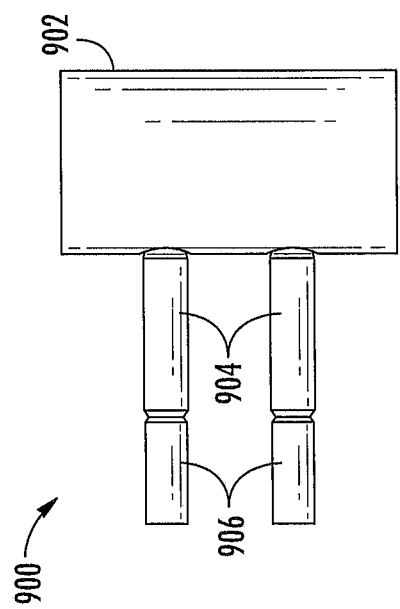
FIG. 9A is top-side partial view of an alternative embodiment of a header and tube transition, according to the present application.
Figure 9C:
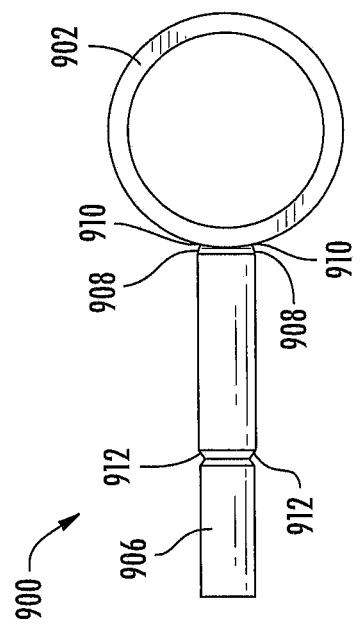
FIG. 9C is a right-side view of the header and tube transition of FIG. 9A.

Referring to FIG. 9C, multiple weld locations are depicted. For example, a first weld location 908 is used to attach the tube transition fitting 904 to the header portion 902. The first weld location 908 may be disposed around an outer circumference of the head portion 910 of the tube transition fitting 904, and preferably comprises a fillet weld. A second weld location 912 may be disposed around an outer circumference of a chamfered end, which end is opposite the head portion 910 of the tube transition fitting 904. In this embodiment, the second weld location 912 comprises a butt weld. Although a size of the butt weld may vary, the edge of the heat exchanger tube 906 should be chamfered at about a 35-40 degree angle, similar to the pre-chamfered end of the tube transition fitting 904. The heat exchange tube 906 should also have at least one of a flare, plain bevel, and compound bevel formed thereon to match the pre-formed flare, plain bevel, or compound bevel formed on the end of the tube transition fitting 904.

Figure 10A:
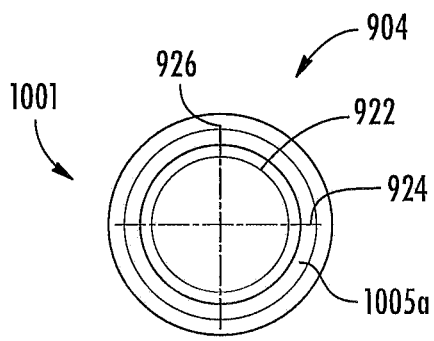
FIG. 10A is top view of an alternative embodiment of a tube transition, according to the present application.
Figure 10C:
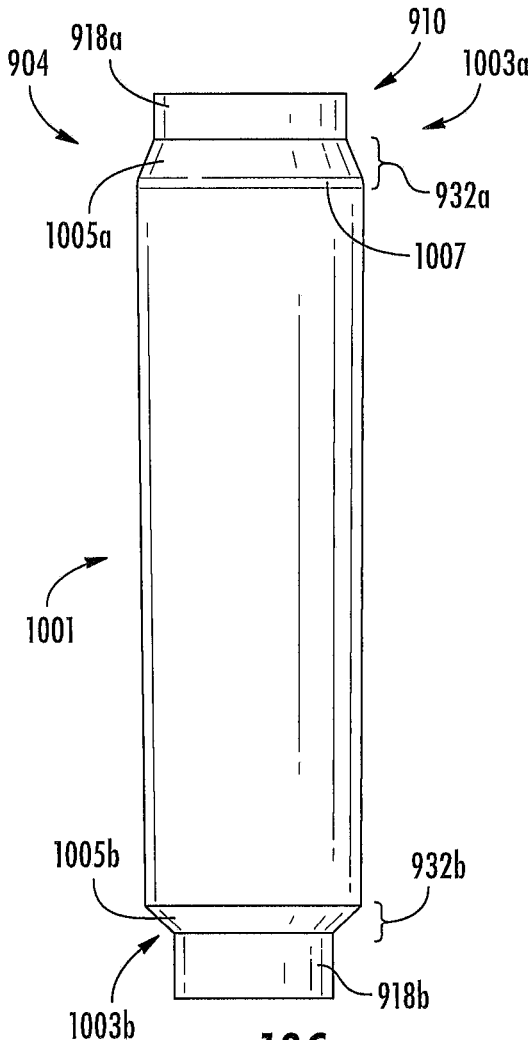
FIG. 10C is a right-side view of the tube transition of FIG. 10A.
Figure 10B:
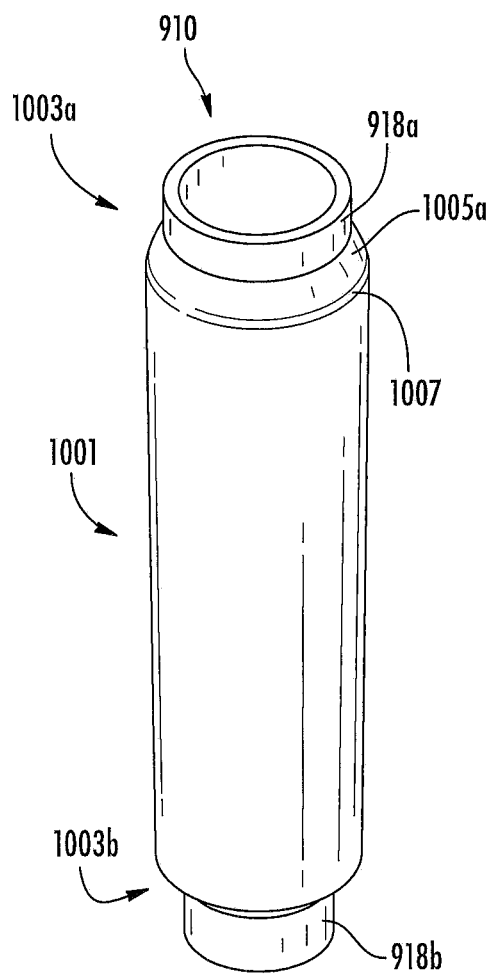
FIG. 10B is a perspective view of the tube transition of FIG. 10A.

Referring now also to FIGS. 10A-10C in the drawings, the tube transition fitting 904 preferably has an opening 922 that is centered along a horizontal axis 924 and a longitudinal axis 926. Preferably, the opening in the header portion 902 for the connection between the tube transition fitting 904 and the header portion 902 is not chamfered, but rather comprises a straight-edged opening to seat or mate with tube seat 918a. A first fillet weld may be formed on and/or around a first angled surface 1005a according to an associated thickness 932a. The tube transition fitting 904 includes a second tube seat 918b below a second angled surface 1005b, which has an associated thickness 932b for forming a portion of a butt weld thereon. Both the first tube seat 918a and the second tube seat 918b are external relative to the body portion 1001 and the respective neck portions 1003a and 1003b of the tube transition fitting 904.

Preferably, the tube transition fitting 904 includes a ridge or lip 1007 formed below the first neck portion 1003a. In this embodiment, the lip 1007 may act as a heat sink during formation of the fillet weld to connect the tube transition fitting 904 to the header portion 902.

Referring now also to FIGS. 11A-11D in the drawings, an alternative embodiment of a header tube transition assembly 1100 is illustrated. Tube transition assembly 1100 functions similar to the tube transition assembly 100, except that the connection between the header portion 1102 and the tube transition fitting 1104 is created using a pre-formed beveled end of the tube transition fitting 1104 and an external tube seat surface 1118 (see FIG. 12C) seated within a partially beveled opening 1120 in the header portion 1102. Preferably, the tube transition fitting 1104 is connected to the header portion 1102 using one or more welds, and the heat exchange tube 1106 is floatingly inserted into an opening 1140. A gasket or O-ring may be placed around the end of the heat exchange tube 1106 that is inserted into opening 1140 to seal the opening and create a connection between the heat exchange tube 1106 and the tube transition fitting 1104. Alternatively, a tube seat or converging surface (not shown) is formed on the interior surface in the end opposite the head 1110 of the tube transition fitting 1104, such that the gasket or O-ring is optional.

Referring to FIG. 11C, a single weld area is depicted. For example, the single weld area 1108 is used to attach the head 1110 of tube transition fitting 1104 to the header portion 1102. The single weld area 1108 is disposed around an outer beveled circumference of the head portion 1110 of the tube transition fitting 1104, and preferably comprises a single fillet weld. Alternatively, a gasket or O-ring is inserted over the head 1110, and one or more spot welds in the areal 1108 are used to hold the gasket, O-ring, or tube transition fitting 1104 in place.

Figure 12A:
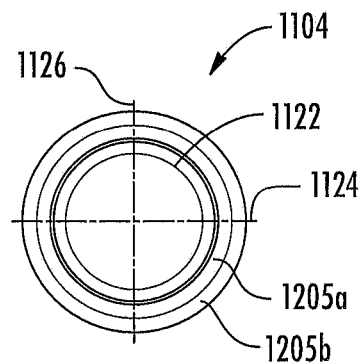
FIG. 12A is top view of an alternative embodiment of a tube transition, according to the present application.
Figure 12B:
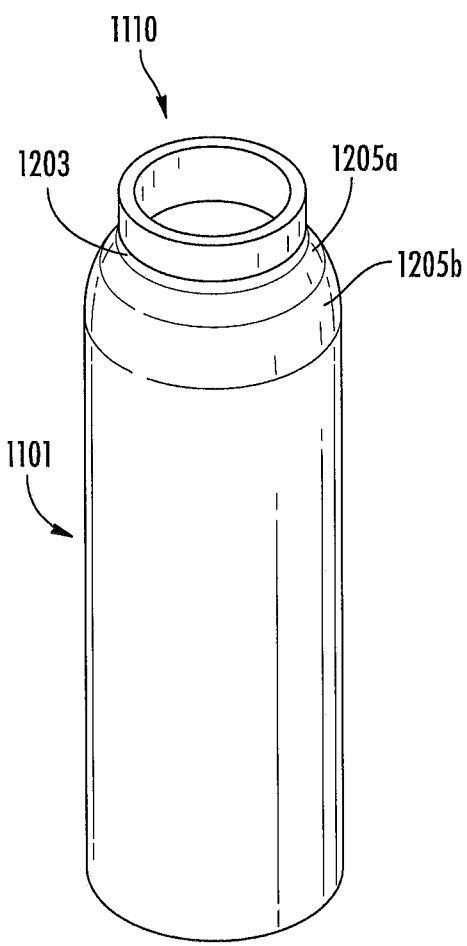
FIG. 12B is a perspective view of the tube transition of FIG. 12A.
Figure 12C:
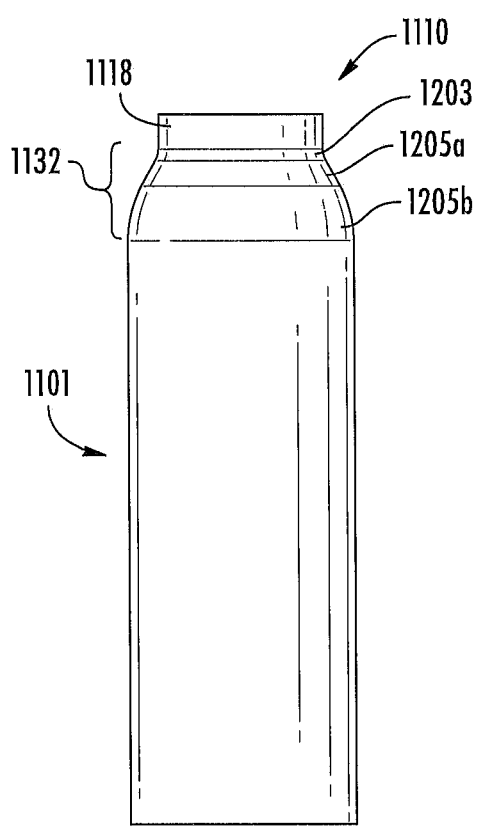
FIG. 12C is a right-side view of the tube transition of FIG. 12A.

Referring now also to FIGS. 12A-12C in the drawings, preferably, the tube transition fitting 1104 has an opening 1122 that is centered along a horizontal axis 1124 and a longitudinal axis 1126. Preferably, the opening in the header portion 1102 for the connection between the tube transition fitting 904 and the header portion 902 includes a beveled or chamfered surface and a straight-edged surface to seat or mate with tube seat surface 1118. The tube seat surface 1118 is externally located relative to the body portion 1101. A single fillet weld may be formed on and/or around a first angled surface 1205a and/or a second angled surface 1205b according to an associated thickness 1132. In other words, the weld area 1108 includes either one of or both of the angled surfaces 1205a and 1205b. Preferably, the first angled surface 1205a and the second angled surface 1205b are beveled or rounded surfaces with a smooth transition between the two. Alternatively, at least the second angled surface 1205b includes a chamfered or straight-lined surface.

The tube transition fitting 1104 includes tube seat surface 1118 above or adjacent a third angled surface or neck surface 1203. Neck surface 1203 may comprise a lip or ridge, having either or convex or concave surface, depending on the intent thereof. Neck surface 1203 transitions to tube seat surface 1118. In this embodiment, the HAZ is dependent on the associated thickness 1132 of at least three transitioning regions, including each of the angled or beveled surfaces 1205a, 1205b, and neck surface 1203. Each of the regions of the HAZ are different from another region based on one or more of a height, thickness, curvature, surface hardness, texture, porosity, and composition. In at least one embodiment, tube seat surface 1118 is a fourth HAZ transitioning region.

It should be appreciated that the foregoing embodiments of the present application do not require scalloped edges, flanged ends, or plug/slot locations. Alternative embodiments may utilize none, some, or all of these elements, depending upon the desired use.

Figure 13:
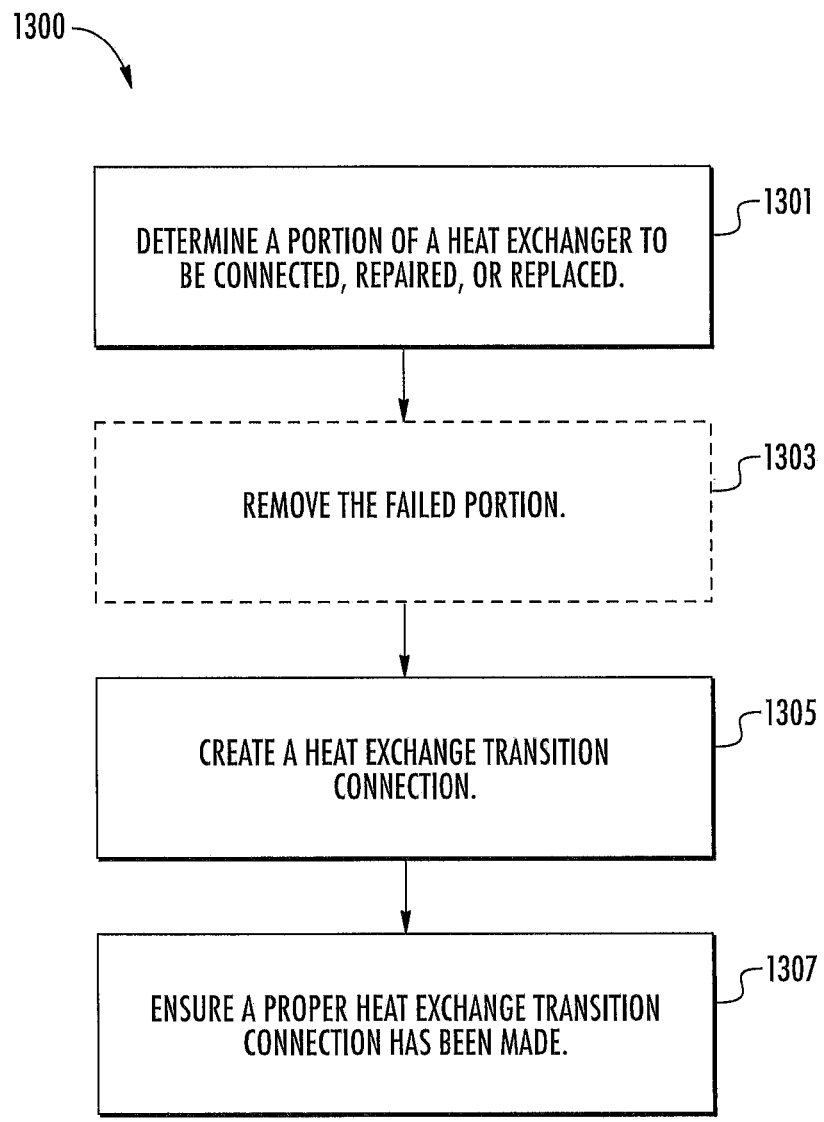
FIG. 13 is a flow diagram of a method of connecting, repairing, or replacing a portion of a heat exchanger, according to the present application.

Referring now also to FIG. 13 in the drawings, a method of repairing, replacing, or connecting a portion of a heat exchanger, such as a failed or leaking portion, is illustrated. Step 1301 includes determining a portion of a heat exchanger to be connected, repaired, or replaced. The determination may be made by a visually perceiving a crack, detecting a pressure loss through digital, electronic, or automated means, or determining a decrease in fluid flow by way of a monitoring and reporting system. For example, a pressure test may be performed on a section of a heat exchanger, and continuous pressure loss may be reported by electrochemical software such as Opto22 Control Software, which pressure loss indicates a crack or a leak. The location of the crack or leak may be otherwise detected using industry-approved methods, such as with fluorescent sprays, ultraviolet lights, foaming liquids, smoke, odors, etc.

Optional step 1303 includes removing the failed, cracked, or leaking portion of the heat exchanger based on the results of step 1301. For example, at step 1301 a heat exchange tube having a crack in a sidewall or in the weld at a manifold, header, and/or plenum is detected. Thus, the tube is removed using rotating, cutting, torching, heating, or combinations thereof. Step 1303 is optional because when manufacturing a heat exchanger using the tube transition assembly components of the present application, the assembly can occur without having to remove a failed, cracked, or leaking portion.

Step 1305 includes creating a heat exchange transition connection between a first portion of a heat exchange tube and at least one of a second portion of a heat exchange tube and a header portion of the heat exchanger. For example, the header of a heat exchanger may be fitted with a tube transition fitting into which the heat exchange tube is inserted, where the tube transition fitting comprises the heat exchange transition connection. By way of another example, two separate ends of a cut heat exchange tube may be inserted into opposite ends of a tube transition fitting to cover a leaking or cut-out portion of the heat exchange tube.

Step 1307 includes ensuring a proper connection has been made. Step 1307 may include retesting the repaired portion of the heat exchanger to determine the strength, integrity, and overall function of the connection. This retesting may include pressure testing, fluorescent liquids, ultraviolet lights, foaming liquids, odorous substances, and other similar procedures. Preferably, this retesting does not require X-ray detection.

Figure 14:
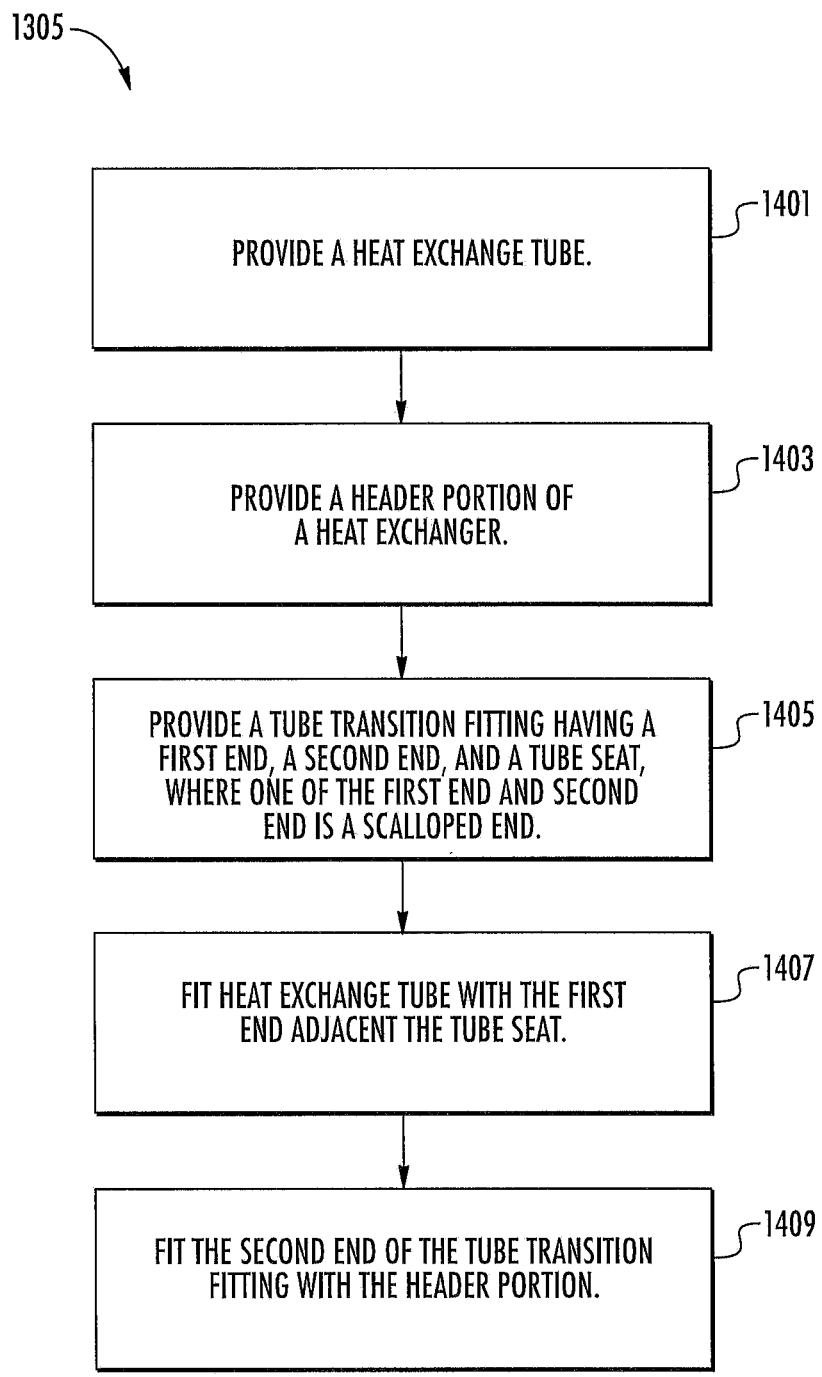
FIG. 14 is a flow diagram of a process of the method of FIG. 13.

Referring now also to FIG. 14 in the drawings, the step 1305 of creating a heat exchange transition connection is depicted as an assembly process. The assembly process 1305 includes a step 1401 of providing a heat exchange tube, a step 1403 of providing a header portion, and a step 1405 of providing a tube transition fitting. The tube transition fitting provided is a fitting that is configured according to the present application.

The process 1305 further includes step 1407, fitting an end of the heat exchange tube with a first end of the tube transition fitting, having the end of the heat exchange tube adjacent a tube seat of the tube transition fitting. For example, the first end of the heat exchange tube may be threaded into the tube transition fitting to abut the tube seat, slid into the fitting till it similarly abuts the tube seat, seated within the fitting leaving a gap between the tube seat and the scalloped end to accommodate slight heat expansion, or welded in place to abut the tube seat. In embodiments, step 1407 further includes securing the first end of the tube transition fitting to the heat exchange tube using a fillet weld around a circumference of the first end and a circumference of the heat exchange tube. In at least one embodiment, step 1407 includes a securing of the end of the heat exchange tube to the first end of the tube transition fitting using a plurality of tab welds placed on or within a plurality of plug slots formed in the tube transition fitting.

At step 1409, the second end of the tube transition fitting is fit with the header portion. For example, a flanged end of the tube transition fitting is secured to the header portion using a fillet weld. By way of another example, the second end of the tube transition fitting may be chamfered or beveled, which is secured within an opening of the header portion, which opening may or may not be chamfered or beveled similar to the chamfered or beveled end of the tube transition fitting. One or more gaskets or O-rings may also be used to fit the second end of the tube transition fitting with the header portion.

Referring now also to FIGS. 15A-15E in the drawings, a header with tube transitions is illustrated. FIGS. 15A and 15B best illustrate a header 1503 having a plurality of tube transitions 1501 connected to header 1503. The plurality of tube transitions 1501 includes straight tube transitions 1505 and angled tube transitions 1507. Preferably, the connection point between header 1503 and the plurality of tube transitions 1501 is secured through welding. While FIG. 15A shows one row of straight transitions 1505 and a second row of angled tube transitions 1507, it should be appreciated that the configuration of these straight and angled tube transitions 1505, 1507 may vary, depending on the proper fit and desired locations of the present invention. While the ends of tube transitions 1505, 1507 are not scalloped, like in other embodiments, it should be appreciated that the ends do not need to be completely flat. For example, the ends of tube transitions 1505, 1507 may be angled, such that multiple tube transitions may be seated in header 1503 simultaneously. FIG. 15C best illustrates an adjacent connection of straight tube transition 1505 and angled tube transition 1507 to header 1503. FIG. 15D illustrates the connection portion of straight tube transition 1505. It should be appreciated that the size of this connection portion may vary, and that any size of tube may extend from the connection portion, as is shown in FIGS. 15A-15C. FIG. 15E illustrates the connection portion of angled tube transition 1507. It should be appreciated that the size of this connection portion may vary, and that any size of tube may extend from the connection portion, as is shown in FIGS. 15A-15C.

The header and tube transition configuration of FIGS. 15A-15E is particularly well suited for those applications in which an entire header section is being repaired and/or replaced, or when an entire header section is being originally manufactured. The tube ends 1506 would simply be welded to the existing tubes in the steam generator, preferably with the use of sleeves 2001 (see FIGS. 20A-20C). To aid in aligning and connecting tube ends 1506 to the existing tubes in the steam generator, some or all of the tube ends my be cut at an angle to allow the tube ends to be mated with the existing tube prior to final insertion of the group of tube ends into the existing tubes.

Referring now also to FIGS. 16A-16D in the drawings, an inlet header with tube transitions is illustrated. FIGS. 16A and 16B best illustrate an inlet header 1603 having a plurality of tube transitions 1601 connected to inlet header 1603. The plurality of tube transitions 1601 can be any number of individual tube transitions 1605. FIG. 16D illustrates an example embodiment of tube transition 1605. Alternative embodiments may be used, depending on the desired fit and function of the tube transition 1605. The connection between inlet header and tube transitions 1605 is preferably secured through welding. Inlet header 1603 may also have other attachments, such as brackets 1607 or additional tubing 1609, although these elements are not required. FIG. 16C shows a side view of one embodiment with bracket 1607 mounted to inlet header 1603 and tube transition 1605 connected on the opposite side of inlet header 1603. It should be appreciated that other configurations of the bracket 1607 and tube transition 1605 are possible, such that the elements do not always need to be on opposite sides of inlet header 1603.

Referring now also to FIGS. 17A-17D in the drawings, a tube transition is illustrated. Tube transition 1701 includes a header insert section 1702, a weld area 1705, a middle section 1707, and a tube insertion section 1709. It is preferred that header insert section 1702 is a height h, where h is not more than the thickness of the header walls. By having h be no longer than the thickness of the header wall, the tube transition does not inhibit flow within the header. Weld area 1705 is configured to match a counter bevel on the header exterior, such that a weld can be used to connect tube transition 1701 to a header. Middle section 1707 has thicker walls 1711, designed to better transfer heat through the tube transition. By configuring walls 1711 to be thicker than the standard tube, the tube transition is more durable and less prone to cracks. Tube insertion section 1709 is designed for the tube to be inserted into it. Some surface or edge manipulation may be necessary for a tube to fit properly and be connected to the tube insertion section 1709. FIG. 17C best illustrates an end view of tube transition 1701, with a circular configuration. While this circular configuration is preferred for transition end 1703, it should be appreciated that other configurations may be used to better fit a desired connection point. By utilizing this configuration, the welds are fillet welds, not open root butt welds, which require purging and other labor intensive steps.

Figure 18C:
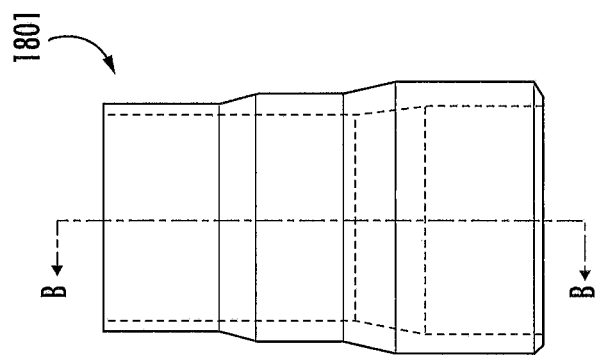
FIG. 18C is a front view of the tube transition of FIG. 18A.
Figure 18D:
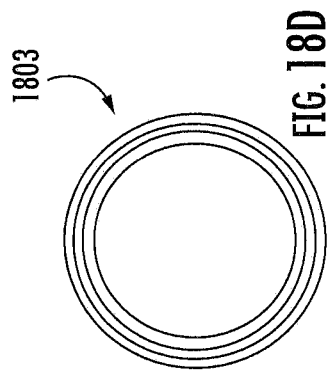
FIG. 18D is a top view of the tube transition of FIG. 18A.
Figure 18B:
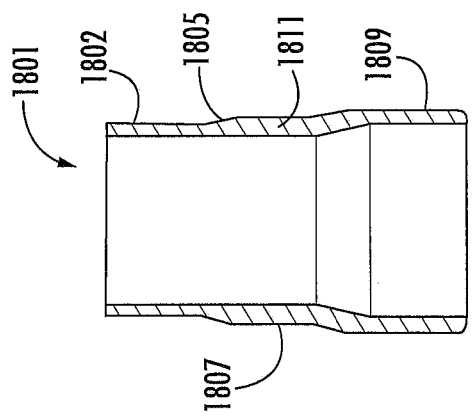
FIG. 18B is a cross-sectional view of the tube transition of FIG. 18A taken at B-B of FIG. 18C.
Figure 18A:
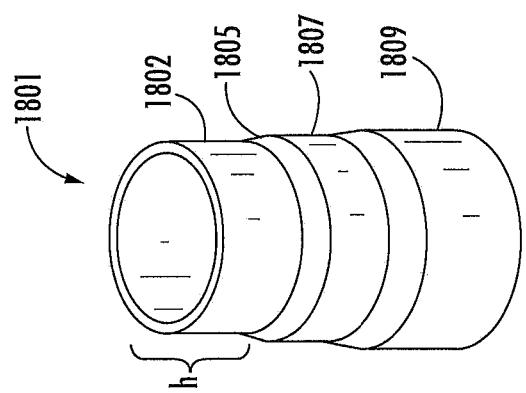
FIG. 18A is a perspective view of a tube transition according to an alternative embodiment of the present application.

Referring now also to FIGS. 18A-18D in the drawings, a tube transition is illustrated. Tube transition 1801 is similar to the embodiment shown in FIGS. 17A-17C, but tube transition 1801 is a different size than tube transition 1701. Tube transition 1801 includes a header insert section 1802, a weld area 1805, a middle section 1807, and a tube insertion section 1809. It is preferred that header insert section 1802 is a height h, where h is not more than the width of the header walls. By having h be no longer than the width header walls, the tube transition does not inhibit flow within the header. Weld area 1805 is configured to match a counter bevel on the header exterior, such that a weld can be used to connect tube transition 1801 to a header. Middle section 1807 has thicker walls 1811, designed to better transfer heat through the tube transition. By configuring walls 1811 to be thicker than the standard tube, the tube transition is more durable and less prone to cracks. Tube insertion section 1809 is designed for the tube to be inserted into it. Some surface or edge manipulation may be necessary for a tube to fit properly and be connected to the tube insertion section 1809. FIG. 18C best illustrates an end view of tube transition 1801, with a circular configuration. While this circular configuration is preferred for transition end 1803, it should be appreciated that other configurations may be used to better fit a desired connection point.

Figure 19C:
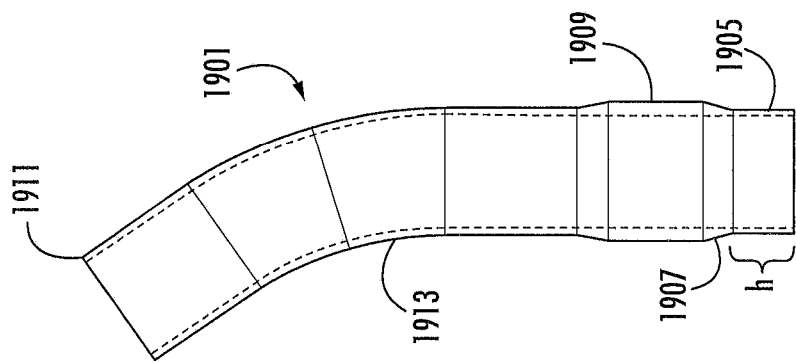
FIG. 19C is a left side view of the angled tube transition of FIG. 19A.
Figure 19B:
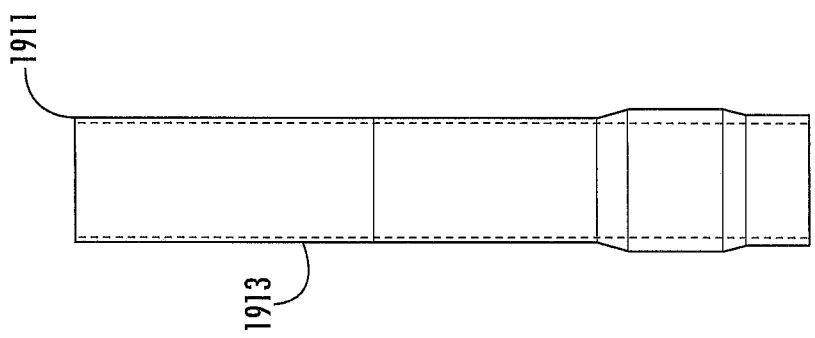
FIG. 19B is a front view of the angled tube transition of FIG. 19A.
Figure 19A:
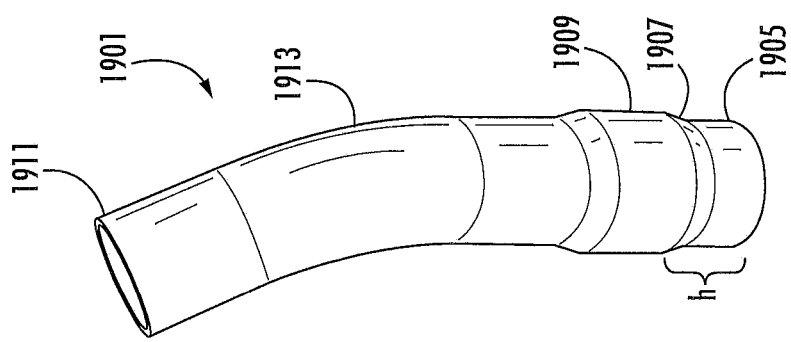
FIG. 19A is a perspective view of an angled tube transition, according to an alternative embodiment of the present application.

Referring now also to FIGS. 19A-19C in the drawings, an angled tube transition is illustrated. Angled tube transition 1901 is preferably formed by the bending of a straight tube transition. It should be appreciated that the angle of angled tube transition 1901 may vary depending on the desired fit of the tube transition. Angled tube transition 1901 includes a header insert section 1905, a weld area 1907, a bulbous section 1909, an elongated tube section 1913, and a connection end 1911. It is preferred that header insert section 1905 is a height h, where h is not more than the width of the header walls. By having h be no longer than the width of the header walls, the tube transition does not inhibit flow within the header. Weld area 1907 is configured to match a counter bevel on the header exterior, such that a weld can be used to connect angled tube transition 1901 to a header. Bulbous section 1909 is configured with thicker walls, designed to aid in the heat transfer from the header into a connected tube. It should be appreciated that bulbous area 1909 may take on various sizes and shapes to achieve the desired heat transfer effect. Elongated tube section 1913 is preferably curved at a selected angle. Tube connection end 1911 is preferably connected to a tube using a sleeve welded over both tube connection end 1911 and the tube. Some surface and edge manipulation may be necessary to achieve the desired connection. It should be appreciated that other methods of connecting the tube connection end 1911 to a tube may be used, even if not preferred.

Figure 20A:
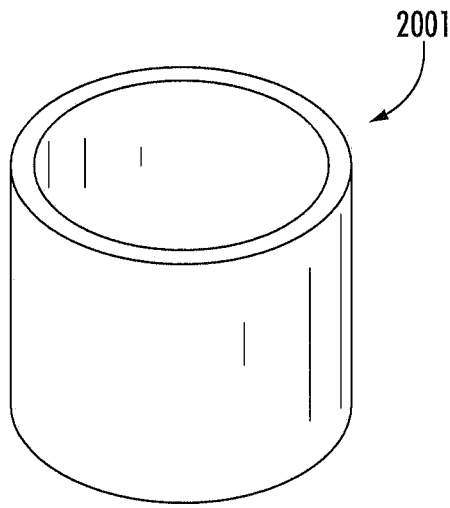
FIG. 20A is a perspective view of a tube sleeve, according to an alternative embodiment of the present application.
Figure 20B:
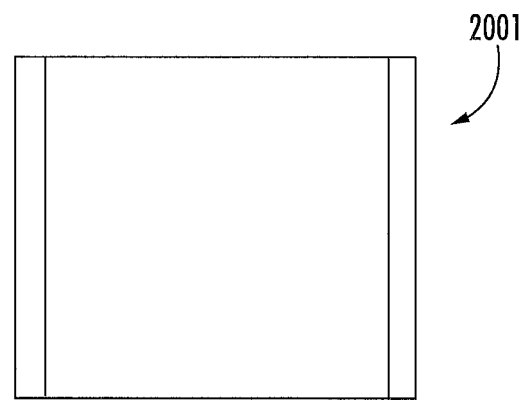
FIG. 20B is a front view of the tube sleeve of FIG. 20A.
Figure 20C:
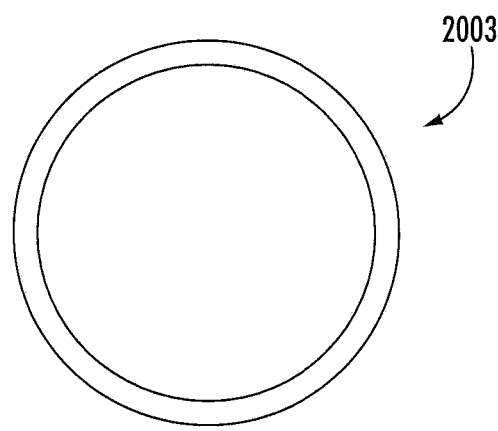
FIG. 20C is a top view of the tube sleeve of FIG. 20A.

Referring now also to FIGS. 20A-20C in the drawings, a sleeve for tube connections is illustrated. Sleeve 2001 is configured to fit over two portions of a tube, where it can then be welded in place. For example, a tube in the rear of a plurality of tubes may need to be accessed for repair, resulting in multiple tubes being cut to gain access. The sleeve 2001 is then placed over a tube that had been cut, and a joining tube is then placed into the other end of sleeve 2001. The sleeve may then be welded on to the two separate tube portions. By using sleeve 2001, the use of open root butt welds is no longer necessary, so the welding process becomes more time and cost efficient. FIG. 20B best illustrates an end view of sleeve 2001, to show that the preferred shape of sleeve end 2003 is circular. However, different sleeve end configurations may be used if the desired fitting require so. Sleeve 2001 may also be used to connect angled tube transition 1901 to a tube. Preferably, sleeve 2001 is configured to properly fit tube connection end 1911.

Figures 21A, 21B:
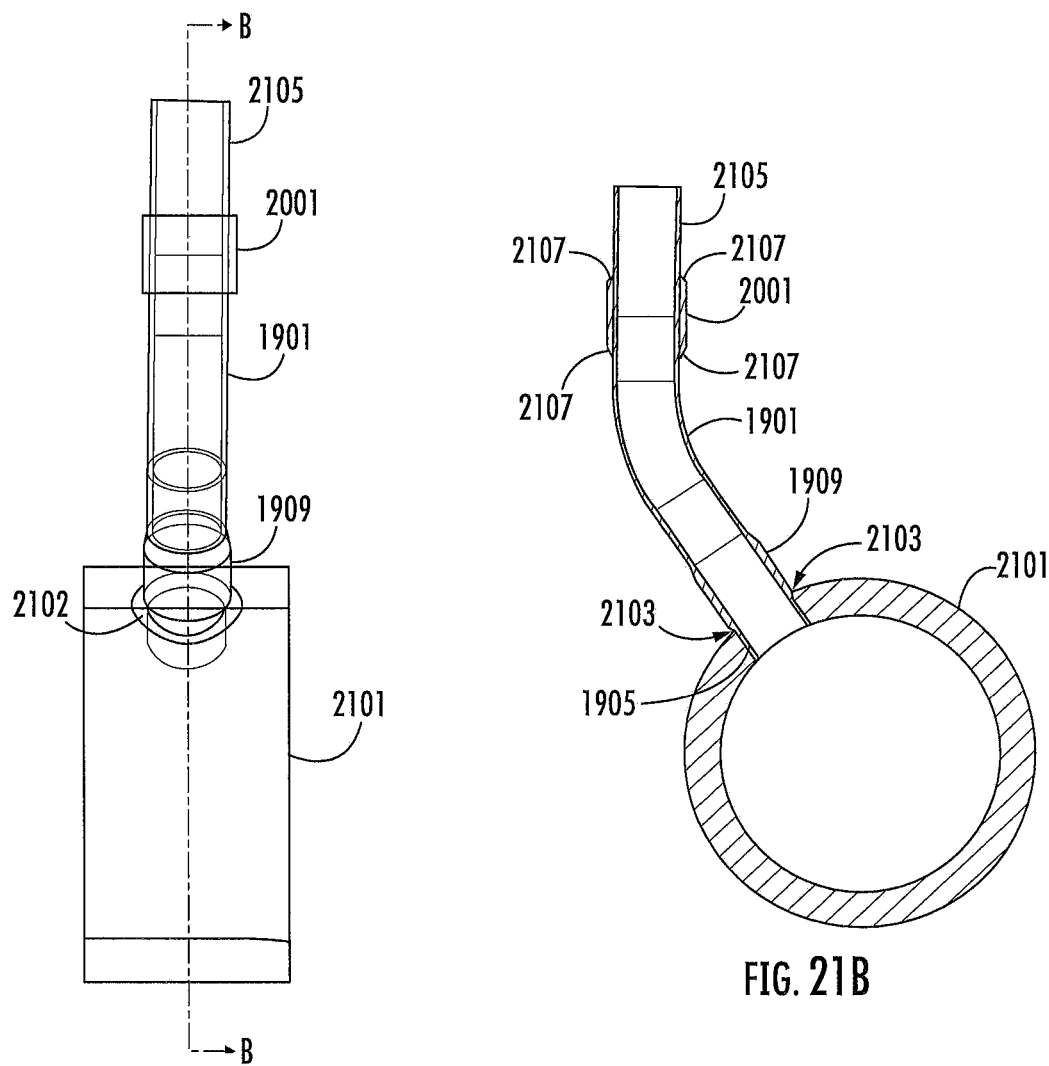
FIG. 21A is a front view of a header, an angled tube transition, and a tube sleeve according to an alternative embodiment of the present application.
FIG. 21B is a cross-sectional view of the header, angled tube transition, and tube sleeve of FIG. 21A taken at B-B of FIG. 21A.

Referring now also to FIGS. 21A and 21B in the drawings, an angled tube transition connected to a tube and a header is illustrated. Header insert section 1905 is inserted into header 2101 and welded in place around header insert section at weld points 2103, best shown in FIG. 21B. FIG. 21A shows counter bevel 2102, where weld points 2103 may be made. Again, bulbous area 1909 helps the heat transfer from header 2101 into angled tube transition 1901, and further into a tube 2105. The aided heat transfer increases durability of the system. Angled tube transition 1901 is connected to tube 2105 by placing a sleeve 2001 over the ends of each and then welding the pieces around sleeve 2001 at sleeve weld points 2107.

Referring now also to FIGS. 22A-22B and 23A-23B in the drawings, a header with tube transitions is illustrated. FIGS. 22A and 22B illustrate a short tube transition 1801, and FIGS. 23A and 23B illustrate a longer tube transition 1701. Tube transitions 1701 and 1801 are inserted into header 2201, where tube transitions 1701 and 1801 are then welded on counter bevel 2203, to create weld points 2205. It should be appreciated that the configuration of which tube transition type and where to insert into the header may vary, depending on the desired application.

Referring now also to FIGS. 24A-24D in the drawings, a tube with a plug is illustrated. FIGS. 24A and 24B best illustrate another use of the welding technique of the present application. A plug 2401 is configured for insertion into a tube 2402, to act as a cap for the tube 2402. Plug 2401 includes a tube insert portion 2403 that is designed to fit within the interior portion of tube 2402. An end of tube 2402 and the insert end of plug 2401 preferably have beveled portions, such that a weld area 2405 is present when the two pieces are joined. Preferably, a fillet weld 2407 may then be used to secure the connection between plug 2401 and tube 2402. While the preferred embodiment is designed for the use of fillet welds to avoid the use of butt welds, it should be appreciated that other welds may be used to establish a secure connection between plug 2401 and tube 2402. FIG. 24C best illustrates the plug 2401 while not connected to any tube.

While FIGS. 24A-24C display dimensions of the plug and tube, it should be appreciated that other dimensions may be used while still maintaining the same functionality of the present invention. The unique configuration of the plug 2401 may be used for capping different types of tubes. For example, plug 2401 may be particularly well suited to cap a long neck flange that has a portion cut off.

Again, by utilizing this configuration, the welds are fillet welds, not open root butt welds, which require purging and other labor intensive steps. It will be appreciated that the tube transition fittings disclosed herein are the only fittings that allow welding to be done without a purge gas inside the tube. These unique "purge-free" fittings provide significant savings in terms of time, cost, and labor. The transition tube fittings of the present application truly change the standard process in installing/welding.

It is apparent that an invention with significant advantages has been described and illustrated. Although the present application is shown in a limited number of forms, it is not limited to just these forms, but is amenable to various changes and modifications without departing from the spirit thereof.

What is claimed is:

1. A method for connecting, repairing, or replacing a boiler tube of a boiler, the boiler having a header portion, the header portion having a header wall, the method comprising:

providing a tube transition fitting, comprising:

a first end and a second end opposite the first end;
a head adjacent the second end, the head having a constant wall thickness;
a body;
a beveled weld area adjacent the head, the beveled weld area being configured such that the tube transition fitting directly welded to the header portion using an external weld;
a first wall thickness; and
a second wall thickness;
wherein a transition between the first wall thickness and the second wall thickness defines a heat transition zone;
wherein a tube seat is formed on a surface connected to the body, the surface being adjacent a transition of the first wall thickness to the second wall thickness; and
fitting the boiler tube with the first end of the tube transition fitting adjacent the tube seat;
securing the boiler tube to the tube transition fitting using an external weld that does not require complete joint penetration, such that the weld does not contact an inner diameter of the boiler tube; and
securing the second end of the tube transition fitting to the header portion;
wherein the tube transition fitting is sizably compatible with the boiler tube, such that flow is consistent when transitioning between the boiler tube and the tube transition fitting;
wherein the head is seated within the header wall after welding, such that the head does not extend into the flow path of the header; and
wherein the tube transition fitting is secured to the header portion and the boiler tube via a purge-free process.

2. The method of claim 1, wherein the external weld for securing the boiler tube within the tube transition fitting is a fillet weld.

3. The method of claim 1, wherein the header portion has a counter beveled area, such that the beveled weld area adjacent the head meets the counter beveled area forming a weld channel upon assembly.

4. The method of claim 3, further comprising:
securing the tube transition fitting to the header portion using a single fillet weld in the weld channel.

5. The method of claim 1, wherein securing the second end of the tube transition fitting to the header portion comprises:
using a single fillet weld.

* * * * *

UNITED STATES PATENT AND TRADEMARK OFFICE
CERTIFICATE OF CORRECTION

| | | |
|---|---|---|
| PATENT NO. | : 12,135,177 B2 | Page 1 of 1 |
| APPLICATION NO. | : 17/873391 | |
| DATED | : November 5, 2024 | |
| INVENTOR(S) | : Marshall R. Hicks, II and John Null | |

It is certified that error appears in the above-identified patent and that said Letters Patent is hereby corrected as shown below:

In the Claims

Column 21, Line 7, insert --is-- between "fitting" and "directly,"

Signed and Sealed this
Twenty-fourth Day of December, 2024

Derrick Brent
*Acting Director of the United States Patent and Trademark Office*